US012499252B2

(12) United States Patent
Shi et al.

(10) Patent No.: US 12,499,252 B2
(45) Date of Patent: Dec. 16, 2025

(54) CROSS-CHAIN RESOURCE TRANSFER USING RESOURCE TRANSFER CERTIFICATE

(71) Applicant: Tencent Technology (Shenzhen) Company Limited, Guangdong (CN)

(72) Inventors: Yifang Shi, Shenzhen (CN); Zongyou Wang, Shenzhen (CN); Qucheng Liu, Shenzhen (CN); Gengliang Zhu, Shenzhen (CN); Hanqing Liu, Shenzhen (CN); Zhiyong Liao, Shenzhen (CN); Yangjun Huang, Shenzhen (CN); Kaixuan Nie, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 197 days.

(21) Appl. No.: 18/527,493

(22) Filed: Dec. 4, 2023

(65) Prior Publication Data

US 2024/0160755 A1 May 16, 2024

Related U.S. Application Data

(63) Continuation of application No. PCT/CN2023/111728, filed on Aug. 8, 2023.

(30) Foreign Application Priority Data

Nov. 14, 2022 (CN) .......................... 202211421853.3

(51) Int. Cl.
*G06F 21/60* (2013.01)
(52) U.S. Cl.
CPC ................................ *G06F 21/606* (2013.01)

(58) Field of Classification Search
CPC ..................................................... G06F 21/606
See application file for complete search history.

(56) References Cited

U.S. PATENT DOCUMENTS

2018/0285837 A1* 10/2018 Wu ..................... G06Q 20/3829
2019/0058581 A1* 2/2019 Wood ..................... H04L 9/3239
(Continued)

OTHER PUBLICATIONS

Kannengiesser, et al. "Bridges Between Islands: Cross-Chain Technology for Distributed Ledger Technology", 2020, Proceddings of the 53rd Hawaii International Conference on System Sciences, pp. 5298-5307. (Year: 2020).*
(Continued)

*Primary Examiner* — William S Powers
(74) *Attorney, Agent, or Firm* — ArentFox Schiff LLP

(57) ABSTRACT

A processing method includes acquiring, by a first service node of a first blockchain, a cross-chain transfer request, the cross-chain transfer request including a virtual resource value, a first resource transfer-out address on the first blockchain, and a first resource transfer-in address on a second blockchain. The cross-chain transfer request is used by a second service node of the second blockchain to lock a first virtual resource of the virtual resource value in the second blockchain. The method further includes performing resource transfer-out processing on a second virtual resource associated with the virtual resource value in the first resource transfer-out address in response to a determination that the second service node locked the first virtual resource successfully. The method further includes transferring the first virtual resource to the first resource transfer-in address in the second blockchain in response to a determination that the second virtual resource was transferred out.

20 Claims, 9 Drawing Sheets

(56) References Cited

U.S. PATENT DOCUMENTS

| | | | |
|---|---|---|---|
| 2019/0347657 A1* | 11/2019 | Guo | G06Q 20/389 |
| 2020/0177388 A1* | 6/2020 | Qiu | G06Q 20/027 |
| 2022/0156725 A1* | 5/2022 | Iwama | G06Q 20/3676 |

OTHER PUBLICATIONS

Tian, et al., "Enabling Cross-Chain Tranactions: A Decentralized Cryptocurrency Exchange Protocol" 2021, IEE Transactions on Information Forensics and Security, pp. 3928-3932. (Year: 2021).*

Mao et al., "A Survey on Cross-Chain Technology: Challenges, Development, and Prospect", 2022, IEEE Access, pp. 45,527-45,546. (Year: 2022).*

* cited by examiner

CROSS-CHAIN RESOURCE TRANSFER USING RESOURCE TRANSFER CERTIFICATE

RELATED APPLICATIONS

This application is a continuation of International Application No. PCT/CN2023/111728, filed on Aug. 8, 2023, which claims priority to Chinese Patent Application No. 202211421853.3, entitled "BLOCKCHAIN-BASED DATA PROCESSING METHOD, DEVICE, AND READABLE STORAGE MEDIUM" filed on Nov. 14, 2022. The disclosures of the prior applications are hereby incorporated by reference in their entirety.

FIELD OF THE TECHNOLOGY

This application relates to the field of Internet technologies, including a blockchain-based data processing method, a device, and a readable storage medium.

BACKGROUND OF THE DISCLOSURE

With the rapid development of network technology and the emphasis of government and enterprise on data security, blockchains have received great attention and application.

In related technologies, if cross-chain resource transfer occurs between different blockchains, the resource needs to be transferred between two blockchains by a third-party intermediary recognized by both parties. For example: When a virtual resource is transferred from a first address in a first blockchain to a second address of a second blockchain, the first address needs to transmit the virtual resource to a third-party intermediary jointly recognized by the first blockchain and the second blockchain first, and then the virtual resource is transferred to the second address through the third-party intermediary.

The above cross-chain resource transfer relies on resource transfer of the third-party intermediary, so the resource transfer efficiency is low. Due to direct contact of the third-party intermediary with the virtual resource, there may also be a risk that the virtual resource is stolen outside the first blockchain and the second blockchain, thereby reducing the security of the resource transfer.

SUMMARY

Embodiments of this disclosure provide a blockchain-based data processing method, a device, and a readable storage medium, which can perform cross-chain resource transfer securely and efficiently.

In an embodiment, a blockchain-based data processing method includes acquiring, by a first service node of a first blockchain, a cross-chain resource transfer request initiated by a first account, the cross-chain resource transfer request comprising a virtual resource value, a first resource transfer-out address on the first blockchain, and a first resource transfer-in address on a second blockchain. The second blockchain is different from the first blockchain, the cross-chain resource transfer request being used by a second service node of the second blockchain to lock a first virtual resource of the virtual resource value in the second blockchain. The method further includes performing resource transfer-out processing on a second virtual resource associated with the virtual resource value in the first resource transfer-out address in response to a determination that the second service node locked the first virtual resource successfully using the cross-chain resource request. The method further includes transferring the first virtual resource to the first resource transfer-in address in the second blockchain in response to a determination that the second virtual resource was transferred out successfully.

In an embodiment, a blockchain-based data processing apparatus includes processing circuitry of a first service node of a first blockchain, the processing circuitry configured to acquire a cross-chain resource transfer request initiated by a first account, the cross-chain resource transfer request comprising a virtual resource value, a first resource transfer-out address on the first blockchain, and a first resource transfer-in address on a second blockchain. The second blockchain is different from the first blockchain, the cross-chain resource transfer request being used by a second service node of the second blockchain to lock a first virtual resource of the virtual resource value in the second blockchain. The processing circuitry is further configured to perform resource transfer-out processing on a second virtual resource associated with the virtual resource value in the first resource transfer-out address in response to a determination that the second service node locked the first virtual resource successfully using the cross-chain resource request. The processing circuitry is further configured to transfer the first virtual resource to the first resource transfer-in address in the second blockchain in response to a determination that the second virtual resource was transferred out successfully.

In an embodiment, a non-transitory computer-readable storage medium stores computer-readable instructions thereon, which, when executed by processing circuitry of a first service node of a first blockchain, cause the processing circuitry to perform a blockchain-based data processing method. The method includes acquiring a cross-chain resource transfer request initiated by a first account, the cross-chain resource transfer request comprising a virtual resource value, a first resource transfer-out address on the first blockchain, and a first resource transfer-in address on a second blockchain. The second blockchain is different from the first blockchain, the cross-chain resource transfer request being used by a second service node of the second blockchain to lock a first virtual resource of the virtual resource value in the second blockchain. The method further includes performing resource transfer-out processing on a second virtual resource associated with the virtual resource value in the first resource transfer-out address in response to a determination that the second service node locked the first virtual resource successfully using the cross-chain resource request. The method further includes transferring the first virtual resource to the first resource transfer-in address in the second blockchain in response to a determination that the second virtual resource was transferred out successfully.

The technical solutions provided in the embodiments of this disclosure have at least the following beneficial effects:
when the cross-chain resource transfer request initiated by the first account is acquired, the first service node corresponding to the first blockchain instructs, through the cross-chain resource transfer request, the second service node corresponding to the second blockchain to lock a first virtual resource to be acquired by the first account for the first resource transfer-in address deployed by the first account on the second blockchain in the second blockchain; the second blockchain is different from the first blockchain; and a subsequent problem that the first virtual resource is transferred to the first resource transfer-in address when the second virtual resource is not transferred out from the first resource transfer-out address can be avoided through the process, so computational consumption caused by invalid resource transfer can be avoided.

Further, resource transfer-out processing is performed on a second virtual resource associated with a virtual resource value in the first resource transfer-out address in a case that the second service node locks the first virtual resource successfully; and cross-chain resource transfer is converted into in-chain resource transfer through the first virtual resource locked by the second blockchain in the process, so as to improve the resource transfer efficiency.

Further, the first virtual resource is transferred to the first resource transfer-in address in the second blockchain in a case that the second virtual resource is transferred out successfully; the first virtual resource and the second virtual resource are prevented from being transferred through a third party by a process of performing resource transfer in each of the first blockchain and the second blockchain, the second virtual resource cannot be transferred out of the first blockchain, and the first virtual resource will not be transferred out of the second blockchain, so the security of the first virtual resource and the second virtual resource can be improved. That is: cross-chain resource transfer can be performed in two chains of the first blockchain and the second blockchain securely and efficiently through the first virtual resource, the second virtual resource, and a resource transfer certificate.

DESCRIPTION OF EMBODIMENTS

Figure 1:
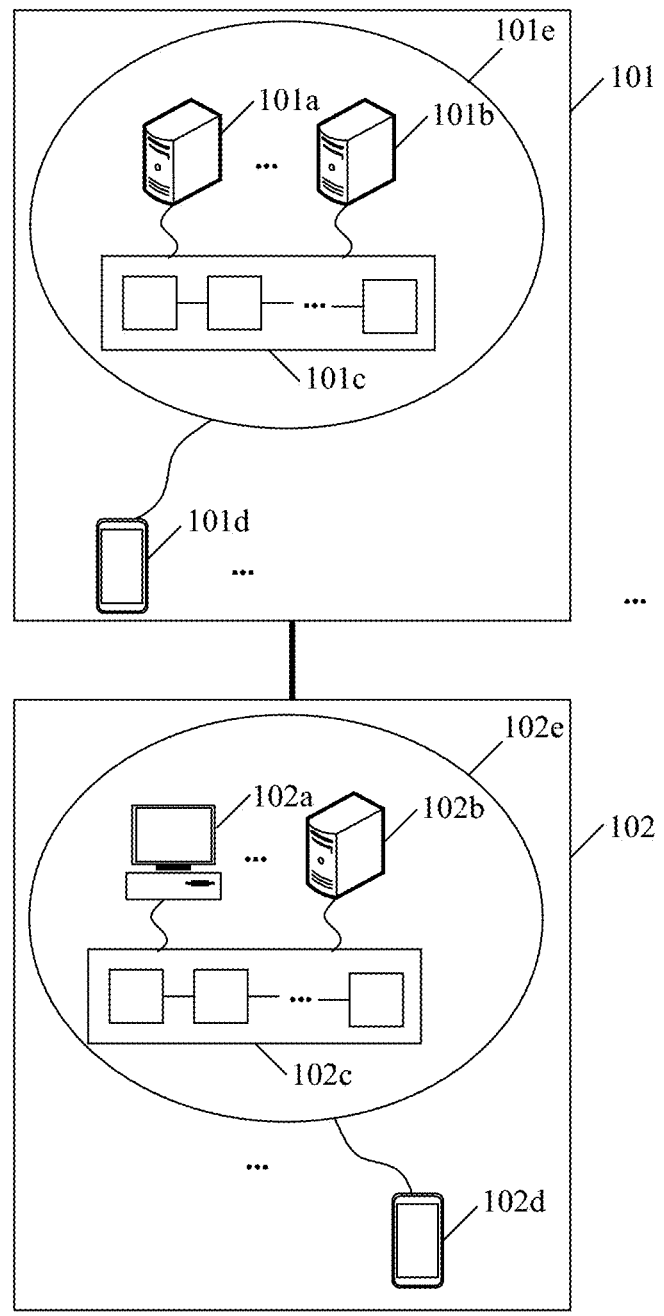
FIG. 1 is a schematic diagram of system architecture provided by an embodiment of this disclosure.

For ease of understanding, first part nouns are briefly explained as follows:

1. Blockchain: In a narrow sense, a blockchain is a chain data structure that takes a block as a unit. In a block, a transaction history acquired previously is verified by using a digital abstract, which is suitable for the requirements of tamper resistance and extendibility in a distributed accounting scenario. In a broad sense, the blockchain also refers to a distributed accounting technology realized by a blockchain structure, including distributed consensus, privacy and security protection, a peer to peer (P2P) communication technology, a network protocol, a smart contract, and the like. The goal of the blockchain is to realize a distributed data record account book. This account book only allows addition, but does not allow deletion. A basic structure at a bottom layer of the account book is a linear linked list. The linked list is formed by blocks connected in series. A subsequent block records a hash of a previous block. Whether each block (and a transaction in the block) is legal can be quickly verified in a manner of calculating the hash. If a node in a network proposes to add a new block, consensus confirmation has to be reached on the block through a consensus mechanism.

2. Block: A block is a data packet carrying transaction data on a blockchain network, and is a data structure marked with a timestamp and a hash corresponding to a previous block. The block is verified by a consensus mechanism of a network and confirms transactions in the block. The block includes a block header and a block body. The block header may record metainformation of a current block, including data such as a current version number, a hash corresponding to the previous block, a timestamp, a random number, and a hash of a Merkle root. The block body may record detailed data generated in a period of time, which includes all transaction records that are verified and are generated during a block creating process of the current block and other information, and may be understood as a representation form of the account book. In addition, detailed data of the block body may include a hash process of a Merkle tree to generate a unique Merkle root to be recorded in the block header.

3. Hash: The hash is also referred to as an information feature value or a feature value. The hash is generated by converting input data of any length into a password through a hash algorithm and performing fixed output, cannot retrieve original input data by decrypting, and is a unidirectional encryption function. In a blockchain, each block (except an initial block) includes the hash of a previous block. The hash is a potential core foundation and an important aspect of a blockchain technology, which maintains the authenticity of recorded and viewed data and the integrity of the blockchain as a whole.

4. Blockchain node: A blockchain network distinguishes blockchain nodes into consensus nodes (which may also be referred to as core nodes and full nodes), and service nodes (which may also be referred to as simplified payment verification, called SPV for short). A consensus node is responsible for consensus services of the whole network of the blockchain. The service node is responsible for synchronizing account book information of the consensus node, that is, synchronizing the latest block data. Whether it is the consensus node or the service node, its internal structure includes a network communication component. The essence of the blockchain network is a P2P network, so the consensus node or the service node needs to communicate with other nodes in the blockchain network through a P2P component. Resources and services in the blockchain network are dispersed on various nodes. The transmission of information and the implementation of the services are directly performed between nodes without the intervention of an intermediate link or a centralized server (a third party).

5. Merkle tree and Merkle root The Merkle tree is a typical binary tree structure, which is composed of a root node (the Merkle root), a group of intermediate nodes, and a group of leaf nodes. The lowest leaf node stores data or the hash thereof, and other nodes store the hashes of the content of two child nodes.

6. Asymmetric signature: An algorithm includes two keys, a public key and a private key. The public key and the private key form a pair. If data is signed by using the private key, signature verification can only be performed by using the corresponding public key. A signing process and a signature verification process respectively use two different keys, so this algorithm is referred to as an asymmetric signature. A basic process that the asymmetric signature realizes confidential information exchange may be that: a party A generates a pair of keys and makes the public key public. When the party A needs to transmit information to other roles (a second party B), confidential information is signed by using the own private key of the party A and then is transmitted to the party B. The party B performs signature verification on the signed information by using the public key of the party A.

7. Smart contract: A smart contract is a computer protocol that aims to propagate, verify, or execute the contract in an informationization manner. In a blockchain system, the smart contract (called a contract for short) is a code that may be understood or executed by each node of the blockchain, and may execute any logic and obtain a result. In practical applications, the smart contract is managed and tried through a transaction on a blockchain. Each transaction is equivalent to a remote procedure call (RPC) request of a blockchain system. If the smart contract is equivalent to an executable program, the blockchain is equivalent to an operating system that provides a running environment. The blockchain may include a plurality of contracts (for example, a local cross-chain resource transfer contract in this disclosure), which are distinguished by identities (ID), identification numbers, or names.

8. Cross-chain resource transfer: Virtual resources between different blockchains are intercommunicated, for example, virtual resources are intercommunicated between a blockchain A and a blockchain B.

Please refer to FIG. 1, which is a schematic diagram of system architecture provided by an embodiment of this disclosure. As shown in FIG. 1, the system architecture may include a blockchain network cluster. The embodiment of this disclosure does not limit the quantity of blockchain networks in the blockchain network cluster, which may be two or more. As shown in FIG. 1, the blockchain network cluster may include a blockchain network 101 and a blockchain network 102.

The blockchain network 101 may include a consensus network 101e and a service network. In order to distinguish from the service network included in the blockchain network 102 hereinafter, the service network included in the blockchain network 101 hereinafter is referred to as a first service network. The service network included in the blockchain network 102 is referred to as a second service network. The blockchain node in the first service network may be referred as a first service node. The embodiment of this disclosure does not limit the quantity of the first service nodes in the first service network, which may include one or more first service nodes. As shown in FIG. 1, the first service network may include a first service node 101d. The consensus network 101e and the first service network may be located in different network environments. Generally, the consensus network 101e is located in a private network, and the first service network is located in a shared network.

The consensus network 101e may be referred to as a first consensus network. The included blockchain node may be referred to as a first consensus node. The embodiment of this disclosure does not limit the quantity of the first consensus nodes in the consensus network 101e, which may include one or more first consensus nodes. As shown in FIG. 1 the consensus nodes 101e may include a first consensus node 101a and the first consensus node 101b. First consensus nodes in the consensus network 101e (for example, the first consensus node 101a and the first consensus node 101b in FIG. 1) maintain the blockchain 101c together, and the blockchain 101c may also be referred as the first blockchain. The blockchain network 102 may include consensus nodes 102e and a second service network. The blockchain node in the second service network may be referred to as a second service node. The embodiment of this disclosure does not limit the quantity of the second service nodes in the second service network, which may include two or more second service nodes. As shown in FIG. 1, the second network service may include a second service node 102d.

The consensus nodes 102e may be referred to as second consensus nodes. The included blockchain node may be referred to a second consensus node. The embodiment of this disclosure does not limit the quantity of the second consensus nodes in the consensus network 102e, which may include two or more second consensus nodes. As shown in FIG. 1, the consensus nodes 102e may include a second consensus node 102a and a second consensus node 102b. The second consensus nodes in the consensus network 102e (for example, the second consensus node 102a and the second consensus node 102b in FIG. 1) maintain the blockchain 102c together, and the blockchain 102c may also be referred as the second blockchain. The consensus network 102e and the second service network may be located in different network environments. Generally, the consensus network 102e is located in a private network, and the second service network is located in a shared network.

There may be a communication connection between blockchain nodes in the blockchain network 101, for example, there may be a communication connection between the first consensus node 101a and the first consensus node 101b, and there may be a communication connection between the first service node 101d and the first consensus node 101a. There may be a communication connection between blockchain nodes in the blockchain network 102, for example, there may be a communication connection between the second consensus node 102a and the second consensus node 102b, and there may be a communication connection between the second service node 102d and the second consensus node 102a. There may be a communication connection between any blockchain node in the blockchain network 101 and any blockchain node in the blockchain network 102, for example, there may be a communication connection between the first consensus node 101a and the second consensus node 102b, and there may be a communication connection between the first service node 101d and the second consensus node 102d. The embodiment of this disclosure does not limit a connection manner of the above communication connection, which may perform direct or indirect connection in a wired communication manner, or may perform direct or indirect connection in a wireless communication or in other manners. No limits are made thereto in this disclosure.

In an embodiment, the blockchain network 101 includes consensus nodes 101e, a service network configured to perform communication interaction with the blockchain network 101 is out of the blockchain network 101, and the service network interacts with the blockchain network 101 through the service network deployed therein, for example: the first service node in the service network is deployed out of the blockchain network 101. Similarly, the blockchain network 102 includes consensus nodes 102e, the service network configured to perform communication interaction with the blockchain network 102 is out of the blockchain network 102, and the service network interacts with the blockchain network 102 through the service network deployed therein, for example: the first service node in the service network is deployed out of the blockchain network 102.

It can be understood that data or block transmission may be performed between the blockchain nodes through the above communication connection. The communication connection between the above blockchain nodes may be based on node identifiers. Each blockchain node in the blockchain network 101 and each blockchain node in the blockchain network 102 have corresponding node identifiers. Each of the above blockchain nodes may store node identifiers of other blockchain nodes having a connection relationship therewith, so that the acquired data or generated block is subsequently broadcast to other blockchain nodes according to the node identifiers of the other blockchain nodes, for example, the first consensus node 101a may maintain a node identifier list, and the node identifier list stores node names and node identifiers of the other block nodes, as shown in Table 1.

TABLE 1

| Node name | Node identifier |
|---|---|
| First consensus node 101b | AAAAA |
| First service node 101d | BBBBB |
| ... | ... |
| Second consensus node 102a | AAAAAA |
| Second consensus node 102b | DDDDD |
| Second service node 102d | EEEEEE |
| ... | ... |

The node identifier may be an Internet protocol (IP) address between networks and any other information that can be used for identifying blockchain node in a blockchain network.

Assuming that a node identifier of the first consensus node 101a is FFFFFF, the first consensus node 101a may transmit a resource transfer certificate described hereinafter to the first consensus node 101b through a node identifier AAAAAA, and the first consensus node 101b may determine that the resource transfer certificate is transmitted by the first consensus node 101a through the node identifier FFFFFF. Data transmission between other blockchain nodes is also like this, which will not be described in detail one by one.

It can be understood that different enterprises include different service data. In order to ensure the security of the service data, the service data corresponding to different enterprises are stored in different blockchains. In the embodiment of this disclosure, each blockchain node (including the blockchain node in the blockchain network 101 and the blockchain node in the blockchain network 102) works normally, a service transaction transmitted by a client may be received, and a block is generated on the basis of the received service transaction, and then uploading process of the block is performed, that is, uploading processing is performed in the blockchain maintained by the blockchain node. It can be understood that, in a specific implementation of this disclosure, relevant data such as user information (for example, a first resource transfer-in address and a first resource transfer-out address) is involved. When the embodiment of this disclosure is applied to a product or a technology, user permission or consent needs to be acquired, and the collection, use, and processing of the relevant data need to comply with relevant laws, regulations, and standards of relevant countries and regions.

It can be understood that the blockchain node (including the blockchain node in the blockchain network 101 and the blockchain node in the blockchain network 102) in FIG. 1 includes, but is not limited to, a mobile terminal or a server. The server may be an independent physical server, or may be a server cluster or a distributed system composed of a plurality of physical servers, or may be a cloud server providing basic cloud computing services such as a cloud service, a cloud database, cloud computing, a cloud function, cloud storage, a network service, cloud communication, a middleware service, a domain name service, a security service, a content delivery network (CDN), big data, and an artificial intelligence platform, or the like. The mobile terminal includes, but is not limited to, a mobile phone, a computer, a smart voice interaction device, a smart home appliance, a vehicle terminal, an aircraft, and the like. The mobile terminal and the server may be directly or indirectly connected in a wired or wireless communication manner. No limits are made thereto in the embodiments of this disclosure.

Figure 2:
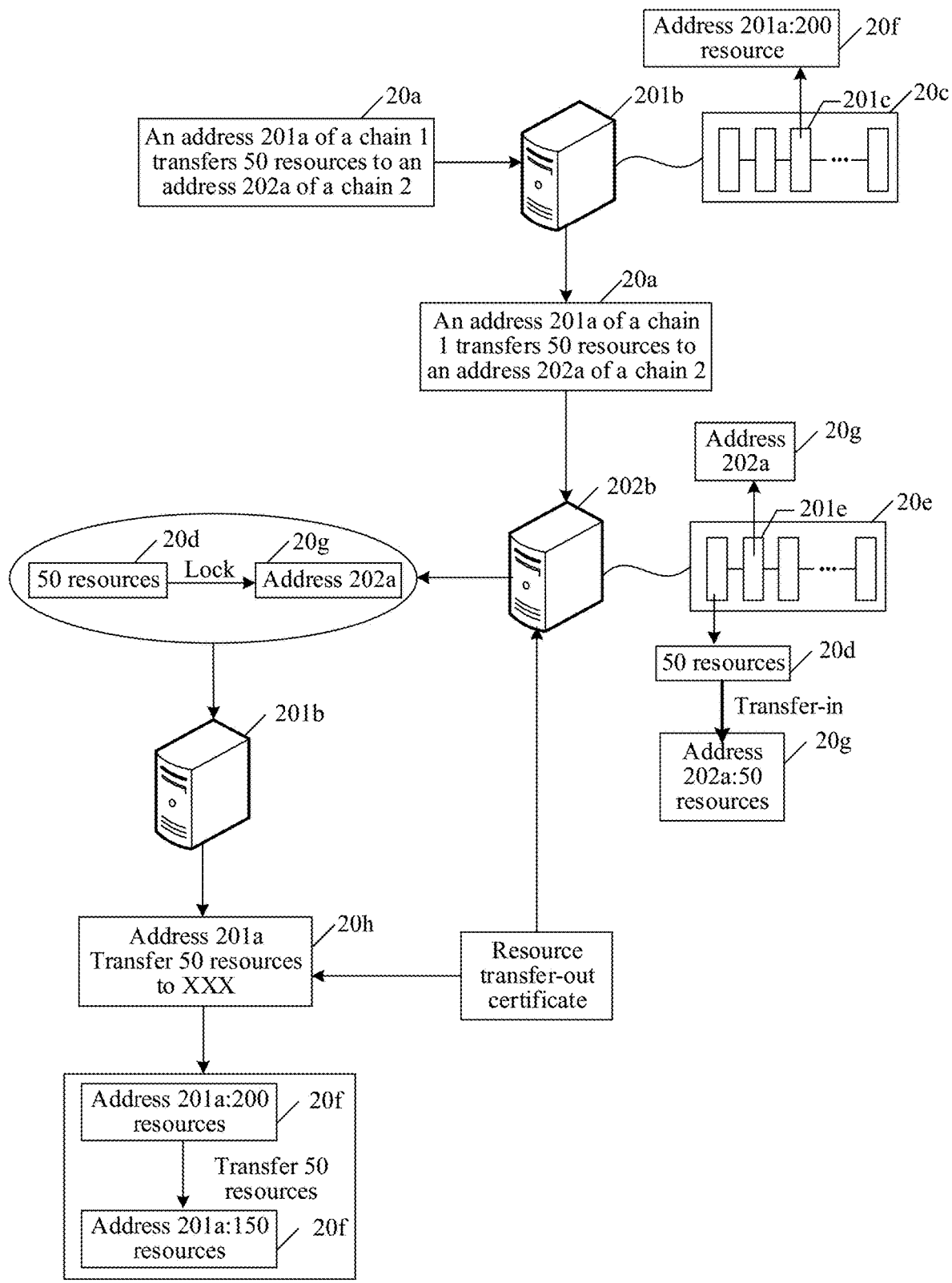
FIG. 2 is a first schematic diagram of a blockchain-based data processing scenario provided by an embodiment of this disclosure.

Further, please refer to FIG. 2, which is a first schematic diagram of a blockchain-based data processing scenario provided by an embodiment of this disclosure. An implementation process of the data processing scenario may be performed a first service node, or may be performed by a second service node, or may also be performed by the first service node and the second service node. No limits are made herein. For the convenience of description and understanding, the embodiment of this disclosure is described by taking an example in which the method is performed in the first service node. The first service node may be any first service node in the first service network of the embodiment corresponding to FIG. 1.

As shown in FIG. 2, the first service node 201b acquires a cross-chain resource transfer request 20a initiated by a first account. A login device of the first account may be a first service node 201b, or may be a terminal device having a communication connection relationship with the first service node 201b. No limits are made thereto in the embodiments of this disclosure. In the embodiment of this disclosure, the cross-chain resource transfer request 20a is illustrated as "transferring 50 resources from an address 201a of a chain 1 to an address 202a of a chain 2" in FIG. 2. FIG. 2 illustrates a first blockchain 20c with "a chain 1", illustrates a first resource transfer-out address 20f configured by a first account on the first blockchain with "an address 201a", a second blockchain 20e with "a chain 2", illustrates a first resource transfer-in address 20g configured by the first account on the second blockchain with "an address 202a", and illustrates a virtual resource value with the "50 resources". The address 201a belongs to the first blockchain 20c. The total value of the virtual resource held by the address 201a is 200 resources, for example, the address 201a that holds the 200 resources is stored in the block 201c of the first blockchain 20c. The address 202a belongs to the second blockchain 20e, for example, the address 202a that does not hold a virtual resource currently is stored in the block 201e of the second blockchain 20e. The second blockchain 20e and the first blockchain 20c are two chains independent of each other, so the transfer of the 50 resources from the address 201a to the address 202a belongs to cross-chain resource transfer.

Please FIG. 2 again, the first service node 201b belongs to a service node corresponding to the first blockchain 20c, for example, the service node in the first service network mentioned in FIG. 1 above; and the second service node 202b belongs to the service node corresponding to the second blockchain 20e, for example, the service node in the second service network mentioned in FIG. 1 above. It can be understood that the first service node 201b and the second service node 202b may be the same service node, or may be different service nodes. The embodiment of this disclosure does not temporarily describe a process of determining a node relationship between the first service node 201b and the second service node 202b. Please refer to the description in step S101 in an embodiment corresponding to FIG. 3 hereinafter.

It can be understood that, if the first service node 201b and the second service node 202b are the same service node, then the first service node 201b is deployed with two different blockchains, that is, the first blockchain 20c and the second blockchain 20e, so the first service node 201b may directly access the second blockchain 20e according to the cross-chain resource transfer request 20a, and a subsequent process is performed. If the first service node 201b and the second service node 202b are different service nodes, then the first service node 201b is not deployed with the second blockchain 20e, the second service node 202b is not deployed with the first blockchain 20c, as shown in FIG. 2, the first service node 201b forwards the cross-chain resource transfer request 20a to the second service node 202b. It can be understood that, if the first service node 201b and the second service node 202b are the same service node, a subsequent process of the first service node 201b is the same as the process described hereinafter. The only difference is that the first service node 201b and the second service node 202b do not need data interaction, that is, the first service node 201b is performed independently.

Please refer to FIG. 2 again, the second service node 202b locks the first virtual resource 20d, that is, 50 resources in FIG. 2, to be acquired by a first account for a first resource transfer-in address 20g (that is, the address 202a) according to the cross-chain resource transfer request 20a in the second blockchain 20e. At this moment, the second service node 202b only locks the first virtual resource 20d (that is, the 50 resources) for the address 202a to prevent the first virtual resource 20d from participating other resource transfer processing. In this process, the first virtual resource 20d is not transferred to the address 202a, which can avoid that the first virtual resource 20d that has been transferred to the address 202a is transferred out to the address 202a when the first resource transfer-out address 20f (for example, the address 201a in FIG. 2) does not transfer the second virtual resource successfully, so that computational consumption caused by transferring an invalid resource can be avoided. It is to be understood that a virtual resource value corresponding to the first virtual resource 20d may be equivalent to a virtual resource value corresponding to the second virtual resource. However, the first virtual resource 20d is not the second virtual resource, the first virtual resource 20d is sourced from the second blockchain 20e, and the second virtual resource is sourced from the first blockchain 20c.

If the second service node 202b locks the first virtual resource 20d successfully, the first service node 201b performs resource transfer-out processing on the second virtual resource associated with the virtual resource value in the first resource transfer-out address 20f in the first blockchain 20c, that is, the second virtual resource is transferred out from the first resource transfer-out address 20. At this moment, the current virtual resource of the first resource transfer-out address 20f is updated, that is, the current virtual resource is updated from 200 resources to 150 resources.

When the second virtual resource is transferred out successfully from the first resource transfer-out address 20f, the first virtual resource 20d is transferred to the first resource transfer-in address 20g in the second blockchain, that is, the address 202a, and at this moment, the current virtual resource at the address 202a is updated, that is, the current virtual resource is updated from 0 resource to 50 resources.

In conclusion, in a cross-chain resource transfer scenario, through the first virtual resource belonging to the first blockchain and the second virtual resource belonging to the second blockchain, a virtual resource to be transferred does not need to be transferred through a third party other than the first blockchain and the second blockchain in the embodiment of this disclosure, so not only the resource transfer efficiency can be improved, but also the resource transfer security can also be improved. In addition, through a resource transfer certificate, it can be ensured that the second virtual resource is transferred out from the first resource transfer-out address, so the resource transfer security can be further improved.

Figure 3:
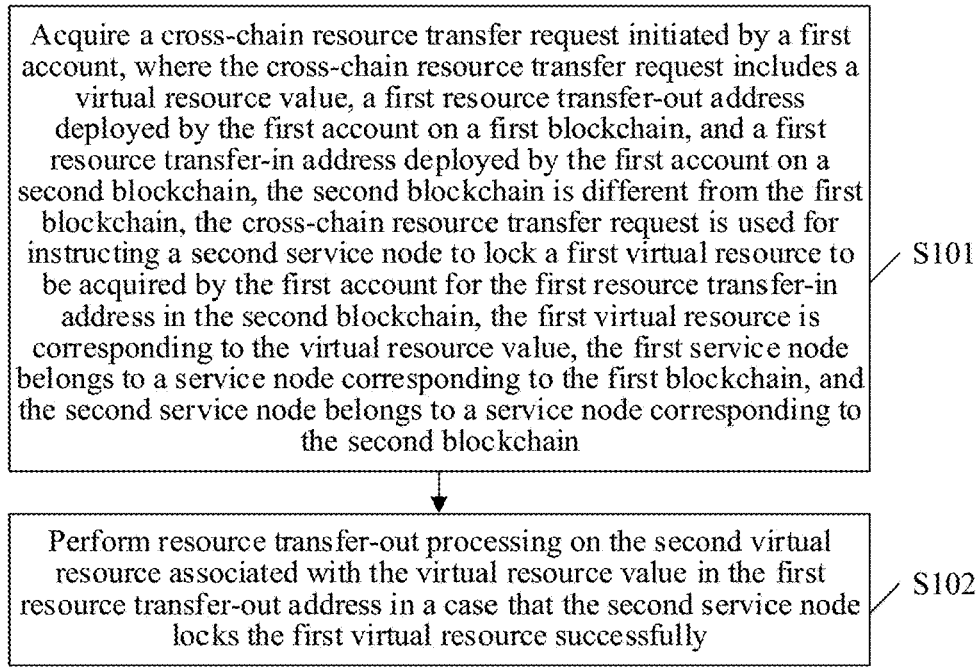
FIG. 3 is a first schematic flowchart of blockchain-based data processing method provided by an embodiment of this disclosure.

Further, please refer to FIG. 3, which is a first schematic flowchart of a blockchain-based data processing method provided by an embodiment of this disclosure. The blockchain-based data processing method may be performed by the first service node, or may be performed by a second service node, or may be performed by the first service node and the second service node interactively. No limits are made herein. For the convenience of description and understanding, the embodiment of this disclosure is described by taking an example in which the method is performed in the first service node. The first service node may be any first service node in the first service network of the embodiment corresponding to FIG. 1. As shown in FIG. 3, the blockchain-based data processing method may at least include the following step S101 to step S102:

Step S101: Acquire a cross-chain resource transfer request initiated by a first account. The cross-chain resource transfer request includes a virtual resource value, a first resource transfer-out address deployed by the first account on a first blockchain, and a first resource transfer-in address deployed by the first account on a second blockchain. The second blockchain is different from the first blockchain. The cross-chain resource transfer request is used for instructing a second service node to lock a first virtual resource to be acquired by the first account for the first resource transfer-in address in the second blockchain. The first virtual resource corresponds to the virtual resource value. The first service node belongs to a service node corresponding to the first blockchain. The second service node belongs to a service node corresponding to the second blockchain. For example, a cross-chain resource transfer request initiated by a first account is acquired by a first service node of a first blockchain. The cross-chain resource transfer request includes a virtual resource value, a first resource transfer-out address on the first blockchain, and a first resource transfer-in address on a second blockchain. The second blockchain is different from the first blockchain, the cross-chain resource transfer request being used by a second service node of the second blockchain to lock a first virtual resource of the virtual resource value in the second blockchain.

Schematically, the first account is implemented as a personal account or an exchange account. The personal account is used for characterizing an account opened by an individual user. The exchange account is used for characterizing an account opened by a merchant opened by a company, an enterprise, or the like participating a transaction.

In an embodiment, the first account is registered on the first blockchain. Through a registering process, the first account can perform a resource transaction process on the first blockchain. In addition, the first account is also registered on the second blockchain. Through the registering process, the first account can also perform the resource transaction process on the second blockchain. Similarly, other accounts may also be registered on at least one blockchain of a plurality of blockchains including the first blockchain and the second blockchain to realize a resource transaction process on the blockchain.

In some embodiments, the first service node receives a cross-chain resource transfer request initiated by the first account. The cross-chain resource transfer request is used for transferring an asset of the first account on the first blockchain to the second blockchain.

Schematically, the virtual resource value included in the cross-chain resource transfer request is used for characterizing a unit for measuring virtual resources, so that a resource transfer process conforms to an equivalent exchange principle. In addition, the cross-chain resource transfer request further includes a first resource transfer-out address and a first resource transfer-in address. The first resource transfer-out address is an address registered by the first account on the first blockchain. The first resource transfer-in address is an address registered on the first account by the second blockchain.

The first resource transfer-out address may be considered as an account registered by the first account on the first blockchain, and is used for performing a resource transaction process. In the embodiment of this disclosure, the resource transfer-out address is used for transferring out the second virtual resource. Similarly, the first resource transfer-in address may be considered as an account of the first account registered on the second blockchain, and is used for performing a resource transaction process. In the embodiment of this disclosure, the first resource transfer-in address is used as an address of the first virtual resource to be transferred by the first account.

In some embodiments, after receiving the cross-chain resource transfer request, the first service node instructs the second service node to lock the first virtual resource acquired by the first account for the first resource transfer-in address in the second blockchain on the basis of the cross-chain resource transfer request.

Schematically, when the first service node and the second service node are the same node, the first service node locks the first virtual resource acquired by the first account for the first resource transfer-in address in the second blockchain. When the first service node and the second service node are different nodes, there is a communication relationship between the first service node and the second service node. The first service node transmits the cross-chain resource transfer request to the second service node, so that the second service node locks the first virtual resource acquired by the first account for the first resource transfer-in address in the second blockchain on the basis of the cross-chain resource transfer request.

The first virtual resource is a virtual resource corresponding to the second blockchain. The virtual resource value is a unit used for measuring virtual resources, the first virtual resource to be acquired by the first account is determined in the second blockchain on the basis of the virtual resource value. The first virtual resource corresponds to the virtual resource value, which is used for characterizing that the first virtual resource refers to a certain quantity of virtual resources determined according to a measurement standard of the virtual resource value. For example: the virtual resource value is 50, then the first virtual resource is a virtual resource equivalent to 50 (50 may be considered as a certain quantity).

The first service node belongs to a service node corresponding to the first blockchain. The second service node belongs to a service node corresponding to the second blockchain. Schematically, the first service node can invoke the data in the first blockchain. The second service node can invoke the data in the second blockchain.

When the first service node and the second service node are the same node, taking the first service node as an example, the first service node can not only invoke the data in the first blockchain, and but also invoke the data in the second blockchain. In addition, when the first service node and the second service node are different nodes, the first service node can invoke the data in the first blockchain. The second service node can invoke the data in the second blockchain. An indirect invoking effect is achieved between the first service node and the second service node by means of a communication relationship.

In an embodiment, a cross-chain resource transfer contract is invoked according to the cross-chain resource transfer request. The cross-chain resource transfer contract is a smart contract synchronized from the first blockchain. An association relationship between the first blockchain and the second blockchain is determined on the basis of the cross-chain resource transfer contract. The association relationship is used for determining the second service node.

The operation of determining the association relationship between the first blockchain and the second blockchain on the basis of the cross-chain resource transfer contract may include that: a first chain structure of the first blockchain and a second chain structure of a second blockchain are respectively acquired on the basis of the cross-chain resource transfer contract; the first chain structure and the second chain structure are compared, and the association relationship between the first blockchain and the second blockchain is determined as an isomorphic association relationship in a case that the first chain structure is the same as the second chain structure; and the association relationship between the first blockchain and the second blockchain is determined as a heterogeneous association relationship in a case that the first chain structure is different from the second chain structure.

Schematically, the chain structure includes a blockchain data structure and a blockchain organization manner. The first chain structure is the same as the second chain structure, which represents that the chain data structures and the organization manners respectively corresponding to the first blockchain and the second blockchain are the same. The first chain structure is different from the second chain structure, which represents that there is at least one difference between the chain data structures and the organization manners respectively corresponding to the first blockchain and the second blockchain.

The association relationship between the first blockchain and the second blockchain is determined by means of the cross-chain resource transfer contract, so as to clarify the relationship between the chain data structure and the organization manner corresponding to the first blockchain and the chain data structure and the organization manner corresponding to the second blockchain, and to perform more targeted analysis on the first service node and the second service node. Therefore, it is beneficial to determining the form of the second service node on the basis of the association relationship, reducing the cumbersomeness of respectively managing the two blockchains by directly using the first service node and the second service node as much as possible, and realizing the overall management of the first blockchain and the second blockchain.

The association relationship includes the isomorphic association relationship that characterizes that the first chain structure and the second chain structure of the first blockchain are the same in structure, and further includes a heterogeneous association relationship that characterizes that the first chain structure and the second chain structure are different, so that more targeted management can be performed on the first blockchain and the second blockchain through the difference between the isomorphic association relationship and the heterogeneous association relationship, which avoids a problem of low efficiency caused by directly analyzing the first blockchain and the second blockchain by ignoring a chain structure, and improves the efficiency of performing comprehensive application analysis on the first blockchain and the second blockchain.

In some embodiments, if the association relationship is the isomorphic association relationship, the cross-chain resource transfer request is transmitted to the second blockchain.

The isomorphic association relationship indicates that the first service node and the second service node are the same service node.

In an embodiment, in a case that a resource locking permission response returned from the second resource transfer-out address is acquired in the second blockchain, the first virtual resource to be acquired by the first account is locked for the first resource transfer-in address in the second resource transfer-out address according to the resource locking permission response.

The second resource transfer-out address is an address deployed on the second account in the second blockchain, and the second account is an account holding the first virtual resource. Schematically, the second account is an account different from the first account. A registration process is performed on the second account on each of the first blockchain and the second blockchain, so that the second account corresponds to the second resource transfer-out address on the second blockchain. In addition, the second account corresponds to the second resource transfer-in address on the first blockchain, so as to realize a process of transferring an asset on the first blockchain to the second blockchain by the first account by means of a resource exchange resource of the first account and the second account on the blockchain.

Schematically, the second account is an account that performs a resource transaction with the first account. When the second blockchain receives the cross-chain resource transfer request, a plurality of accounts registered on the second blockchain analyze the cross-chain resource transfer request, and the account that expects to perform resource transaction with the first account in the plurality of the accounts is taken as the second account. That is: the second account returns the resource locking permission response through the second resource transfer-out address registered on the second blockchain to characterize that the second account expects to perform the resource transaction on the first account, and a resource transaction process can be realized on the second blockchain by transferring the resource to the first resource transfer-in address registered by the first account on the second blockchain. Before resource transaction is completed, the second account returns the resource locking permission response through the second resource transfer-out address to characterize that the first virtual resource of the resources held by the second resource transfer-out address can be locked.

In an embodiment, the second account is a personal account, or the second account is an exchange account.

Schematically, when the second account is a personal account, the second resource transfer-out address of the second account registered on the second blockchain is determined, and the second resource transfer-out address is implemented as an address form used for storing resources. Or, when the second account is an exchange account, the second resource transfer-out address of the second account registered on the second blockchain is implemented as an exchange resource pool. The exchange resource pool is used for characterizing a resource set that is registered on the blockchain by the exchange account and is used for realizing a resource transaction.

Schematically, in a case that a resource locking permission response returned from the second resource transfer-out address is acquired in the second blockchain, a process that the second resource transfer-out address allows to transfer out a resource is determined on the resource locking permission response. On this basis, the first virtual resource to be acquired by the first account is locked in the second resource transfer-out address according to the resource locking permission response, and the first virtual resource is a resource locked for the first resource transfer-in address registered by the first account on the second blockchain.

In some embodiments, the first virtual resource is acquired for the first resource transfer-in address in a virtual resource pool corresponding to the second blockchain in a case that the resource locking permission response is not acquired in the second blockchain.

Schematically, the virtual resource pool is a resource pool corresponding to the second blockchain, and is used for characterizing a resource set that is not registered by an account in the second blockchain and has a certain quantity of resources. In an embodiment, the virtual resource pool is a resource pool that is automatically formed by the second blockchain on the basis of a blockchain computing process. Or, the virtual resource pool is a resource pool that is pre-appointed by a plurality of accounts and is registered on the second blockchain in a contract state.

Whether there is a second resource transfer-out address that allows to be subjected to resource locking on the second blockchain is determined according to whether the resource locking permission response is acquired. The second resource transfer-out address is an address registered by the second account on the second blockchain, so this process can learn whether there is a second account that expects to perform resource transaction with the first account on the second blockchain more intuitively and clearly. In a case that the resource locking permission response is received, the first virtual resource to be acquired by the first account may be locked from the second resource transfer-out address according to the second resource transfer-out address that transmits the resource locking permission response. In a case that the resource locking permission response is not acquired, the first virtual resource to be acquired by the first account from the virtual resource pool corresponding to the second blockchain. The process can better learn whether there is a resource transaction between the second account and the first account to realize a process of transferring a resource on the first blockchain to the second blockchain by the first account. A case that the first account cannot independently realize the process of transferring the resource on the first blockchain to the second blockchain when there is no resource transaction between the second account and the first account can also be avoided through the setting of the virtual resource pool corresponding to the second blockchain, so that a cross-chain resource transfer process can be realized more efficiently and more successfully, and the success rate of the cross-chain resource transfer process is improved.

A process of locking, according to the resource locking permission response, the first virtual resource to be acquired by the first account for the first resource transfer-in address in the second resource transfer-out address may include: a third virtual resource held by the second resource transfer-out address is queried according to the resource locking permission response; the first virtual resource is locked for the first resource transfer-in address from the third virtual resource in a case that the third virtual resource is not less than the first virtual resource corresponding to the virtual resource value; or the first virtual resource is locked for the first resource transfer-in address from the virtual resource pool corresponding to the second blockchain in a case that the third virtual resource is less than the first virtual resource.

When the first virtual resource is locked, a resource quantity relationship between the third virtual resource and the first virtual resource held by the second resource transfer-out address is considered, and the problem that sufficient resource transaction cannot be realized is avoided. A purpose of acquiring a sufficient quantity of first virtual resources is achieved and the success rate of acquiring the first virtual resources is improved by integrating manners of locking the first virtual resources from the third virtual resources or a virtual resource pool corresponding to the second blockchain according to a quantity relationship between the third virtual resources and the first virtual resources. Schematically, the third virtual resource held by the second resource transfer-out address is used for characterizing a quantity of resources registered and stored by the second account on the second blockchain. The resource locking permission response characterizes that the resource in the second resource transfer-out address is allowed to be locked, so the third virtual resource held by the second resource transfer-out address is queried, and the third virtual resource is compared with the first virtual resource acquired by the first account. That is: the resource quantity of the third virtual resources is compared with the resource quantity of the first virtual resources.

In an embodiment, in a case that the third virtual resource is not less than the first virtual resources, it represents that the first virtual resource can be acquired from the third virtual resource, so as to lock the first virtual resource from the third virtual resource held by the second resource transfer-out address. The first virtual resource is a resource locked for the first resource transfer-in address registered by the first account on the second blockchain.

In an embodiment, in a case that the first virtual resource is less than the first virtual resource, it represents that a sufficient quantity of first virtual resources cannot be acquired from the second resource transfer-out address, so as to lock the first virtual resource from the virtual resource pool corresponding to the second blockchain. The first virtual resource is a resource locked for the first resource transfer-in address registered by the first account on the second blockchain.

A process of locking the first virtual resource for the first resource transfer-in address in the virtual resource pool corresponding to the second blockchain in a case that the third virtual resource is less than the first virtual resource may include: The third virtual resource is acquired for the first resource transfer-in address in a case that the third virtual resource is less than the first virtual resource. A first virtual resource difference value between the first virtual resources and the third virtual resources is determined, and the first virtual resource difference value is acquired for the first resource transfer-in address in the virtual resource pool corresponding to the second blockchain.

Schematically, in a case that the third virtual resource is less than the first virtual resource, since a sufficient quantity of first virtual resources cannot be acquired from the second resource transfer-out address, the third virtual resource held by the second resource transfer-out address may be acquired from the second resource transfer-out address first. Since the third virtual resource is less than the first virtual resource, a difference value between the first virtual resource and the third virtual resource may be determined to obtain a first virtual resource difference value, so as to lock the first virtual resource difference value from the virtual resource pool corresponding to the second blockchain. That is: the first virtual resource includes the third virtual resource acquired from the second resource transfer-out address and the first virtual resource difference value locked from the virtual resource pool corresponding to the second blockchain.

Considering that even if the third virtual resource is less than the first virtual resource, in order to facilitate transactions between accounts to fully improve the enthusiasm and activity of the transactions between the accounts, the third virtual resource less than the first virtual resource is still locked from the second resource transfer-out address registered by the second account in the second blockchain, so as to lock the first virtual resource difference value that represents a difference value between the first virtual resource and the third virtual resource from the virtual resource pool corresponding to the second blockchain, which not only realizes a process of locking a sufficient quantity of the first virtual resources, but also facilitates a resource transaction process between accounts.

In an embodiment, an insufficient quantity of virtual resources is locked from transfer-out addresses registered by other accounts on the second blockchain when the third virtual resource is not sufficient to make up for the first virtual resource, and the first account performs a resource transaction process with a plurality of accounts to complete a cross-chain transfer process of transferring the virtual resources from the first blockchain and the second blockchain.

It is worth noting that the above are only schematic examples, and the embodiments of this disclosure do not limit them.

The embodiments of this disclosure provide a smart contract, that is, a cross-chain resource transfer contract, that is deployed and runs on a service node. The cross-chain resource transfer contract is subjected to on-chain verification of the blockchain, and then is synchronized to a service node. This step does not describe an on-chain verification process and an off-chain synchronization process of the cross-chain resource transfer contract temporarily. Please refer to the description of step S202 in the embodiment corresponding to FIG. 7 hereinafter. On this basis, the embodiments of this disclosure provide a solution of realizing cross-chain resource transfer through the cross-chain resource transfer contract. The cross-chain resource transfer contract is code content subjected to on-chain verification, so a trust problem caused by running third-party code can be effectively solved.

Figure 4:
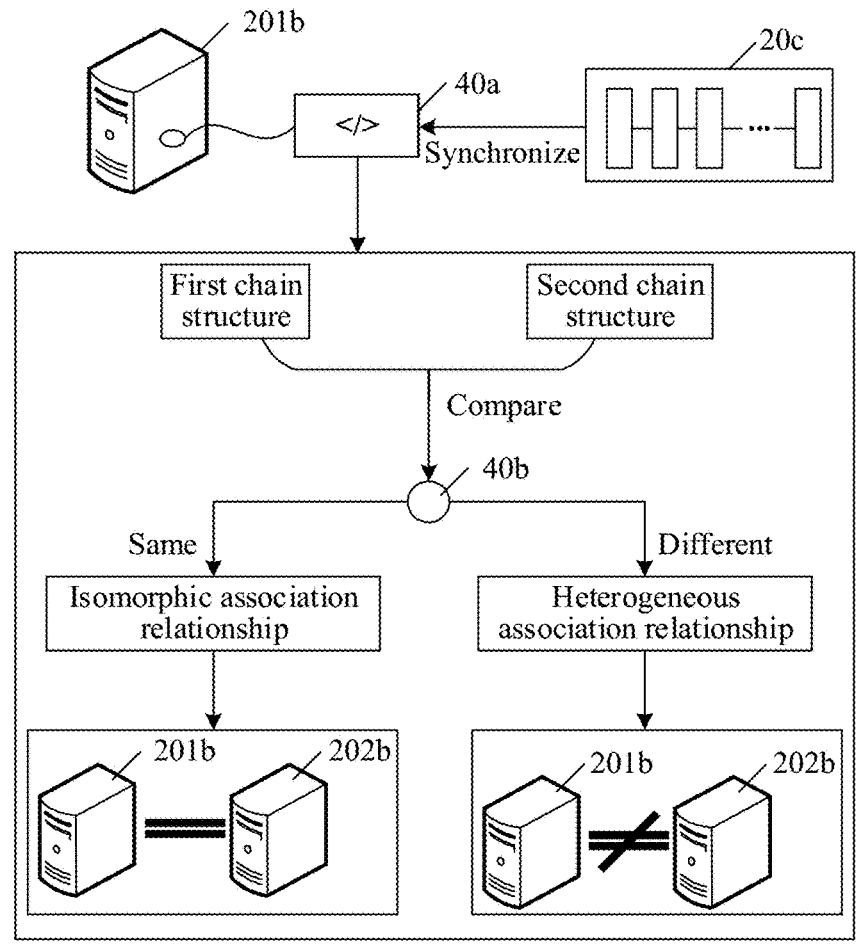
FIG. 4 is a second schematic diagram of a blockchain-based data processing scenario provided by an embodiment of this disclosure.
Figure 5:
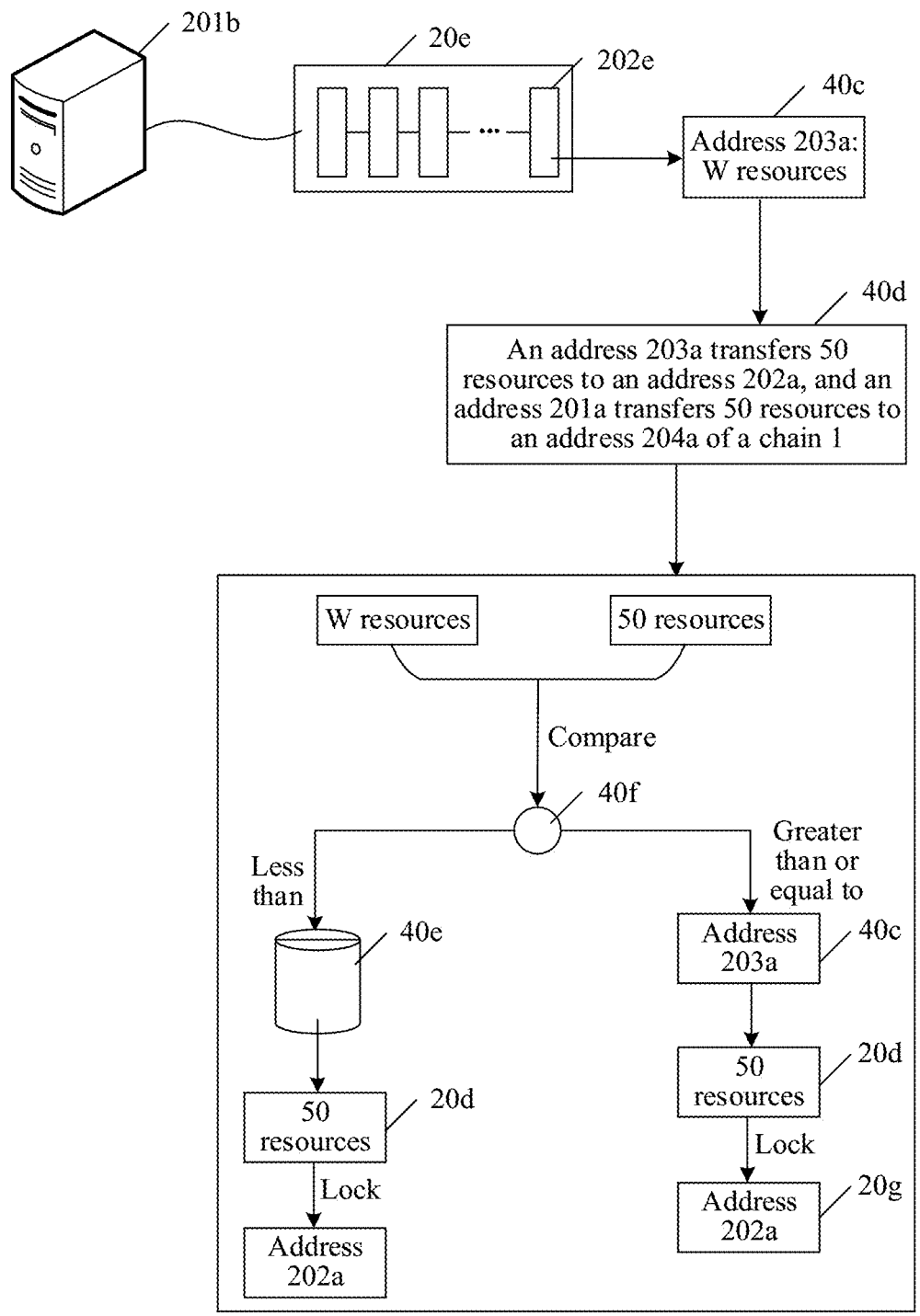
FIG. 5 is a third schematic diagram of a blockchain-based data processing scenario provided by an embodiment of this disclosure.

The first service node acquires the cross-chain resource transfer request initiated by the first account. The first service node invokes the cross-chain resource transfer contract according to the cross-chain resource transfer request. Please refer to FIG. 4 and FIG. 5 together. FIG. 4 is a second schematic diagram of a blockchain-based data processing scenario provided by an embodiment of this disclosure. FIG. 5 is a third schematic diagram of a blockchain-based data processing scenario provided by an embodiment of this disclosure. As shown in FIG. 4, a cross-chain resource transfer contract 40a is a smart contract synchronized from the first blockchain 20c, and is deployed in the first service node 201b. The first service node 201b may determine an association relationship between the first blockchain 20c and the second blockchain 20e by running the cross-chain resource transfer contract 40a. A process of determining the association relationship may be described as follows. The first service node 201b may acquire a first chain structure of the first blockchain 20c and a second chain structure of the second blockchain 20e respectively by running the cross-chain resource transfer contract 40a. The first chain structure may include a chain data structure and an organization manner of the first blockchain 20c. Similarly, the second chain structure may include a chain data structure and an organization manner of the second blockchain 20e.

Please refer to FIG. 4 again, the first service node 201b performs comparison processing on the first chain structure and the second chain structure through the cross-chain resource transfer contract 40a to obtain a first comparison result 40b. If the first comparison result 40b is that the first chain structure is the same as the second chain structure, then it may be determined that the association relationship between the first blockchain 20c and the second blockchain 20e is an isomorphic association relationship, which may also be referred to as that the first blockchain 20c and the second blockchain 20e are isomorphic chains. Further, since the first chain structure and the second chain structure are the same, the first service node 201b may serve the first blockchain 20c and the second blockchain 20e at the same time, that is, the first service node 201b may maintain the first blockchain 20c and the second blockchain 20e at the same time. At this moment, the first service node 201b and the second service node 202b may be the same service node.

If the first comparison result 40b is that the first chain structure is different from the second chain structure, then it may be determined that the association relationship between the first blockchain 20c and the second blockchain 20e is a heterogeneous association relationship, which may also be referred to as that the first blockchain 20c and the second blockchain 20e are heterogeneous chains. Since the first chain structure is different from the second chain structure, the first service node 201b serving the first blockchain 20c cannot serve the second blockchain 20e simultaneously because a chain data structure and an organization manner set by the first service node 201b are not matched with the chain data structure and the organization manner corresponding to the second blockchain 20e. Similarly, the second service node 202b that serves the second blockchain 20e cannot service the first blockchain 20c at the same time. At this moment, the first service node 201b and the second service node 202b are not the same service node.

Further, the second service node 202b may lock a first virtual resource 20d (50 resources in FIG. 5) for a first resource transfer-in address 20g (an address 202a in FIG. 5) in the second blockchain 20e through the association relationship between the first blockchain 20c and the second blockchain 20e. A locking process is as follows. If the association relationship is an isomorphic association relationship, then the first service node 201b and the second service node 202b may be the same service node, that is, the first service node 201b may also maintain the second blockchain 20e different from the first blockchain 20c in addition to maintaining the first blockchain 20c. So, the first service node 201b may transmit a cross-chain resource transfer request to the second blockchain 20e. In a case that a resource locking permission response is not acquired in the second blockchain 20e, that is, the second resource transfer-out address registered by the second account on the second blockchain 20e does not respond to the cross-chain resource transfer request, then the first virtual resource 20d is locked for the first resource transfer-in address 20g (that is, the address 202a) in a virtual resource pool 40e corresponding to the second blockchain 20e. The virtual resource pool 40e may be a virtual resource set that is set by the second blockchain 20e for an on-chain address (including the address 202a and an address 203a mentioned hereinafter). The virtual resource pool 40e may also be an address that is logged in by a cross-chain service device and belongs to the second blockchain 20e. The cross-chain service device provides a cross-chain resource transfer contract for the first blockchain 20c. The cross-chain resource transfer contract is synchronized to the first service node 201b after passing the verification of the first blockchain 20c. It can be understood that a cross-chain resource transfer contract stored in the first blockchain 20c is the same as a cross-chain resource transfer contract stored in the first service node 201b. The only difference is that the cross-chain resource transfer contract stored on a chain serves as evidence data and does not run on the chain, that is, does not run on a first consensus node corresponding to the first blockchain 20c. The cross-chain resource transfer contract runs in the first service node 201b.

Please refer to FIG. 5 again, in a case that a resource locking permission response 40d returned from the second resource transfer-out address 40c is acquired in the second blockchain 20e, then the first service node 201b may acquire a first virtual resource 20d corresponding to a virtual resource value for the first resource transfer-in address 20g in the second resource transfer-out address 40c based on the resource locking permission response 40d, and the second resource transfer-out address 40c belongs to the second blockchain 20e, for example, the second resource transfer-out address 40c is stored in a block 202e of the second blockchain 20e (for example: the second account is registered in the block 202e of the second blockchain 20e). FIG. 5 shows the resource locking permission response 40d as an example that "the address 203a transfers 50 resources to the address 202a, and the address 201a transfers to the 50 resources to the address 204a of the chain 1". FIG. 5 shows the second resource transfer-out address 40c as an example of 203a, which holds W resources currently, and shows the second resource transfer-in address that belongs to the first blockchain 20c as an address 204a, and a response virtual resource (that is, the virtual resource transferred to the second resource transfer-in address) is also 50 resources.

It can be understood that the first service node 201b needs to verify the virtual resource currently held by the second resource transfer-out address 40c before acquiring (locking) the first virtual resource 20d for the first resource transfer-in address 20g. The above process may be described as follows. According to the resource locking permission response 40d, the first service node 201b queries the third virtual resource held by the second resource transfer-out address 40c (the address 203a as shown in FIG. 5), and FIG. 5 is shown as W resources. The first service node 201b compares the third virtual resource with the first virtual resource 20d to obtain a second comparison result 40f. In a case that the second comparison result 40f is that the third virtual resource is greater than or equal to the first virtual resource 20d, then the first service node 201b may acquire the first virtual resource 20d for the first resource transfer-in address 20g in the third virtual resource, that is, 50 resources are locked for the address 202a in the address 203a in FIG. 5. In a case that the second comparison result 40f is that the third virtual resource is less than the first virtual resource 20d, then the first service node 201b acquires the first virtual resource 20d for the first resource transfer-in address 20g in the virtual resource pool 40e, for example, 50 resources are locked for the address 202a in the virtual resource pool 40e in FIG. 5. In an embodiment, in a case that the third virtual resource is less than the first virtual resource 20d, the first service node 201b acquires the third virtual resource for the first resource transfer-in address, further determines a first virtual resource difference value between the first virtual resource 20d and the third virtual resource, and acquires the first virtual resource difference value for the first resource transfer-in address 20g in the virtual resource pool 40e.

This step does not describe a scenario where the association relationship is a heterogeneous association relationship. Please refer to the description in the embodiment corresponding to FIG. 7 hereinafter.

Step S102: Perform resource transfer-out processing on a second virtual resource associated with a virtual resource value in the first resource transfer-out address in a case that the second service node locks the first virtual resource successfully. For example, resource transfer-out processing is performed on a second virtual resource associated with the virtual resource value in the first resource transfer-out address in response to a determination that the second service node locked the first virtual resource successfully using the cross-chain resource request.

Schematically, the second service node feeds back a locking success message to the first service node after the second service node locks the first virtual resource successfully, so that the first service node learns a locking success process.

In an embodiment, the first service node performs resource transfer-out processing on a second virtual resource in the first resource transfer-out address on the basis of the locking success process. The second virtual resource corresponds to the virtual resource value. A resource quantity of the second virtual resources is the same as the resource quantity characterized by the virtual resource value. Since both the first virtual resource and the second virtual resource are measured by the virtual resource value, the resource quantity of the second virtual resources is the same as the resource quantity of the first virtual resources.

Schematically, the resource transfer-out processing is used for characterizing that the second virtual resource is transferred out from the first resource transfer-out address. In an embodiment, the second virtual resource is transferred to the second resource transfer-in address registered by the second account in the first blockchain based on the resource transfer-out processing; or, the second virtual resource is transferred out to a public resource pool and the like on the basis of the resource transfer-out processing.

In an embodiment, the second resource transfer-in address corresponding to the second resource transfer-out address is determined from the first blockchain in a case that the second service node locks the first virtual resource from the second resource transfer-out address.

The second resource transfer-out address is an address registered by the second account on the second blockchain, the second resource transfer-in address is an address registered by the second account on the first blockchain, and the second resource transfer-in address is used for characterizing a transfer-in address after transfer-out processing is performed on the second virtual resource in the first blockchain.

Schematically, the second resource transfer-out address is an address deployed by the second account in the second blockchain, and the second account is an account holding the first virtual resource. Schematically, the second account is an account different from the first account. A registration process is performed on the second account on each of the first blockchain and the second blockchain, so that the second account corresponds to the second resource transfer-out address on the second blockchain. In addition, the second account corresponds to the second resource transfer-in address on the first blockchain, so as to realize a process of transferring an asset on the first blockchain to the second blockchain by the first account by means of a resource exchange resource of the first account and the second account on the blockchain.

In an embodiment, the second account is a personal account, or the second account is an exchange account.

Schematically, when the second account is a personal account, the second resource transfer-out address of the second account registered on the second blockchain is determined, and the second resource transfer-out address is implemented as an address form used for storing resources. Or, when the second account is an exchange account, the second resource transfer-out address of the second account registered on the second blockchain is implemented as an exchange resource pool. The exchange resource pool is used for characterizing a resource set that is registered on the blockchain by the exchange account and is used for realizing a resource transaction. The second resource transfer-in address is used for characterizing a transfer-in address after transfer-out processing is performed on the second virtual resource in the first blockchain. That is: the second resource transfer-in address in the first blockchain is used for receiving the second virtual resource transferred out from the first resource transfer-out address.

In some embodiments, the second virtual resource transferred out from the first resource transfer-out address is transferred to the second resource transfer-in address on the basis of the second resource transfer-in address.

The above content determines a location for transferring the second virtual resource on the basis of a location for locking the first virtual resource. In a case that the location for locking the first virtual resource is the second resource transfer-in address registered by the second account on the first blockchain, the second account may assist the first account in performing a cross-chain resource transfer process, which fully activates the activity of performing a transaction on a blockchain by an account.

In a case that the location for locking the first virtual resource is the second resource transfer-in address registered by the second account on the first blockchain, the second account may assist the first account in performing a cross-chain resource transfer process, In an embodiment, a virtual resource pool corresponding to the first blockchain is determined in a case that the second service node locks the first virtual resource from a virtual resource pool corresponding to the second blockchain. The second virtual resource transferred out from the first resource transfer-out address is transferred to the virtual resource pool corresponding to the first blockchain.

Schematically, the virtual resource pool corresponding to the second blockchain is used for characterizing a resource set that is not registered by an account in the second blockchain and has a certain quantity of resources. In an embodiment, the virtual resource pool is a resource pool that is automatically formed by the second blockchain on the basis of a blockchain computing process. Or, the virtual resource pool is a resource pool that is pre-appointed by a plurality of accounts and is registered on the second blockchain in a contract state.

In an embodiment, the virtual resource pool corresponding to the first blockchain is determined from the first blockchain in a case that the second resource transfer-out address used for transferring out the first virtual resource is the virtual resource pool corresponding to the second blockchain, so that the virtual resource pool corresponding to the first blockchain is used as the second resource transfer-in address for transferring the second virtual resource in the first blockchain.

In a case that the location for locking the first virtual resource is the virtual resource pool corresponding to the first blockchain, the virtual resource pool may assist the first account in performing a cross-chain resource transfer process, which fully avoids a problem that a purpose of cross-chain resource transfer cannot be achieved when there is no account interacts with the first account, and improves the resource transfer success rate.

The first virtual resource is transferred to the first resource transfer-in address in the second blockchain in a case that the second virtual resource is transferred out successfully. Schematically, the first service node instructs the second service node to transfer the first virtual resource to the first resource transfer-in address in the second blockchain after the second virtual resource is transferred out from the first resource transfer-out address in the first blockchain successfully. That is: The second service node transfers the first virtual resource that is locked and is to be acquired by the first account is transferred to the first resource transfer-in address.

In an embodiment, the first virtual resource is a resource that is transferred out from the second resource transfer-out address registered by the second account on the second blockchain. The second service node transfers the first virtual resource transferred out from the second resource transfer-out address to the first resource transfer-in address registered by the first account on the second blockchain.

In an embodiment, a resource transfer certificate is generated in a case that the second virtual resource is transferred out successfully. The first virtual resource is transferred to the first resource transfer-in address in the second blockchain on the basis of the resource transfer certificate.

The resource transfer certificate is used for characterizing that the second virtual resource has been successfully transferred out in the first blockchain.

In an embodiment, the resource transfer certificate is generated in a case that the second virtual resource has been successfully transferred out from the first resource transfer-out address in the first blockchain.

In an embodiment, the resource transfer certificate is generated in a case that the second virtual resource is successfully transferred to the second resource transfer-in address in the first blockchain. Or, the resource transfer certificate is generated in a case that the second virtual resource is successfully transferred to the virtual resource pool corresponding to the first blockchain in the first blockchain.

In an embodiment, a resource transfer certificate is generated in a case that the second virtual resource is transferred out successfully. The resource transfer certificate is transmitted to the second blockchain. The resource transfer certificate is used for instructing the second blockchain to transfer the first virtual resource to the first resource transfer-in address.

Schematically, the second blockchain can acquire the resource transfer certificate after being subjected to consensus by the first blockchain by means of a process of transferring the resource transfer certificate to the second blockchain, so that the second blockchain performs a more accurate resource transfer process on the basis of the resource transfer certificate to perform a subsequent operation on the locked first virtual resource and perform a more targeted resource transfer process on the locked first virtual resource.

In an embodiment, the resource transfer certificate is generated in a case that the second virtual resource is successfully transferred to the second resource transfer-in address in the first blockchain. Or, the resource transfer certificate is generated in a case that the second virtual resource is successfully transferred to the virtual resource pool corresponding to the first blockchain in the first blockchain.

Two cases of the locations where the second virtual resource is successfully transferred are fully considered. The resource transfer certificate used for indicating that the first virtual resource is transferred to the first resource transfer-in address in the second blockchain can be generated in both cases, which improves the probability of transferring the first virtual resource to the first resource transfer-in address, and is beneficial for the first account to achieve cross-chain transfer more quickly and securely.

In an embodiment, a resource transfer transaction including a virtual resource value and the first resource transfer-out address is generated in a case that the second virtual resource is transferred out successfully. The resource transfer certificate generated for the resource transfer transaction is acquired.

The resource transfer transaction is used for verifying whether the second virtual resource has been successfully transferred to the second resource transfer-in address or the virtual resource pool corresponding to the first blockchain. By means of the generation of the resource transfer transaction, it is beneficial for the first blockchain to perform more targeted confirmation on a transfer condition of the second virtual resource. The quantity and the transfer-out address of the second virtual resources can be compared and determined more intuitively through the virtual resource value and the first resource transfer-out address in the resource transfer transaction, which is beneficial for the first blockchain to perform a consensus analysis process on the basis of the resource transfer transaction.

In some embodiments, the resource transfer transaction is transmitted to a first consensus node corresponding to the first blockchain. The first consensus node performs uploading processing on the resource transfer transaction to obtain an upload result. The upload result includes an upload success result. The upload success result is used for instructing a consensus node to generate the resource transfer certificate for the resource transfer transaction. The resource transfer certificate returned by the first consensus node is acquired.

A process of performing consensus analysis on the resource transfer transaction through the first consensus node on the first blockchain is introduced. The first consensus node can perform the uploading processing on the resource transfer transaction, so as to determine whether each node on the first blockchain effectively confirms a transfer-out success of the second virtual resource indicated by the resource transfer transaction according to the meaning of the upload result. If the upload result is an upload success result, the first blockchain effectively confirms the resource transfer transaction, that is, the first blockchain reaches a consensus on this process, and then the first consensus node can generate the resource transfer certificate on the basis of the resource transfer transaction to characterize the consensus case and achieve a more secure and effective consensus process analysis and description purpose.

Figure 6:
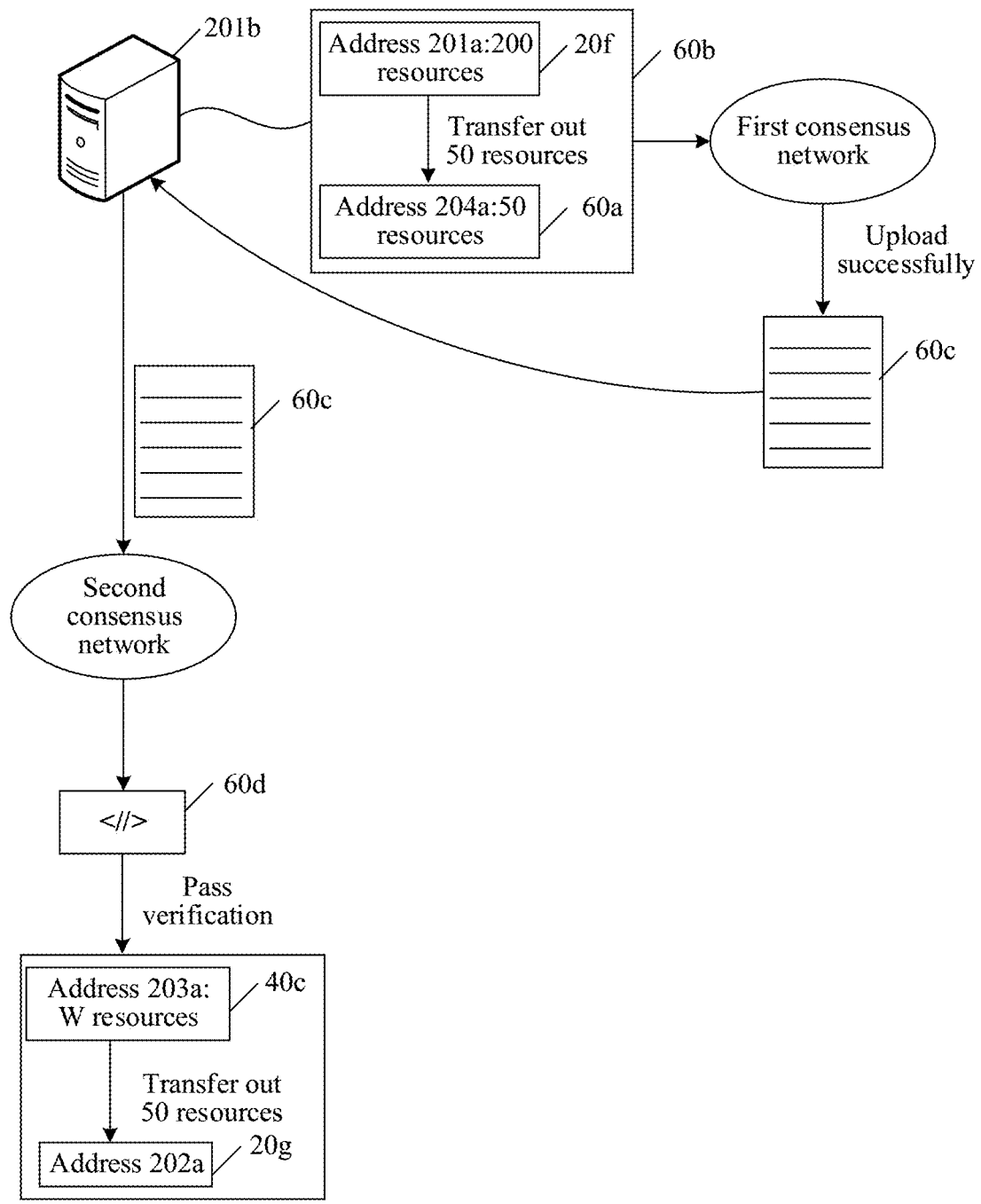
FIG. 6 is a fourth schematic diagram of a blockchain-based data processing scenario provided by an embodiment of this disclosure.

Please refer to FIG. 6 together, which is a fourth schematic diagram of a blockchain-based data processing scenario provided by an embodiment of this disclosure. In FIG. 6, the first service node 201b generates a resource transfer transaction 60b. The resource transfer transaction 60b may include an address 201a (that is, the first resource transfer-out address 200 holding 200 resources and a virtual resource value.

The resource transfer transaction 60b is a transaction generated after the first resource transfer-out address 20f transfers 50 resources to the address 60a. The address 60a is implemented as a second resource transfer-in address registered by the second account on the first blockchain. Or, the address 60a is implemented as a virtual resource pool corresponding to the first blockchain.

Further, the first service node 201b transmits the resource transfer transaction 60b to a first consensus network corresponding to the first blockchain, so that the first consensus node in the first consensus network performs consensus processing on the resource transfer transaction 60b. If the first consensus node achieves consensus on the resource transfer transaction 60b, then the resource transfer transaction 60b is written to the first blockchain. if the resource transfer transaction 60b is successfully written to the first blockchain, then the upload result of the resource transfer transaction 60b is the upload success result. At this moment, the first consensus node generates a resource transfer certificate 60c for the resource transfer transaction 60b. The resource transfer certificate 60c is used for indicating that the locked first virtual resource is transferred to the first resource transfer-in address in the second blockchain. Please refer to FIG. 6 again, the first consensus node returns the resource transfer certificate 60c to the first service node 201b. The examples of this disclosure do not limit the content of the resource transfer certificate 60c, which includes, but is not limited to, a Merkel proof and a read-write set for the resource transfer transaction 60b.

In an embodiment, the resource transfer certificate is transmitted to the second blockchain. The second blockchain performs validation processing on the resource transfer certificate to obtain a first verification result.

Under a condition that the first verification result is a first verification pass result, the second virtual resource is transferred to the second resource transfer-in address associated with the second resource transfer-out address in a case that the first virtual resource is a resource locked in the second resource transfer-out address.

The second resource transfer-out address is an address deployed by the second account in the second blockchain, and the second account is an account holding the first virtual resource. The second resource transfer-in address is an address deployed by the second account in the first blockchain.

In an embodiment, under a condition that the first verification result is a first verification pass result, the first virtual resource transferred from the second resource transfer-out address is transferred to the first resource transfer-in address in a case that the first virtual resource is a resource locked in the second resource transfer-out address. The second resource transfer-out address is an address deployed by the second account in the second blockchain, and the second account is an account holding the first virtual resource. The second resource transfer-in address is an address deployed by the second account in the first blockchain. The first virtual resource locked in the virtual resource pool corresponding to the second blockchain is transferred to the first resource transfer-in address in a case that the first virtual resource is a resource locked in the virtual resource pool corresponding to the second blockchain.

By means of a passing condition pf the first verification result, the location of the first virtual resource is locked integrally to determine the location where the first virtual resource is transferred out, and the first virtual resource transferred out from this location is transferred to the first resource transfer-in address, so that transfer-out and transfer-in conditions of the first virtual resource are learned more intuitively, thereby facilitating more targeted control on the first virtual resource. In some embodiments, in a case that a fourth virtual resource locked in the first virtual resource pool is a resource locked in the second resource transfer-out address, and a second virtual resource difference value in the first virtual resource is a resource locked in the virtual resource pool corresponding to the second blockchain, then the fourth virtual resource is transferred to the second resource transfer-in address. The second virtual resource difference value is used for characterizing a difference value between the first virtual resource and the fourth virtual resource. The second virtual resource difference value is transferred into a virtual resource pool corresponding to the first blockchain.

In some embodiments, the resource transfer certificate is transmitted to the second blockchain in a case that the association relationship is an isomorphic association relationship. A second consensus node corresponding to the second blockchain performs verification processing on the resource transfer certificate through a verification contract to obtain a second verification result. The isomorphic association relationship indicates that the first service node and the second service node are the same service node. The first virtual resource is transferred to the first resource transfer-in address in a case that the second verification result returned by the second consensus node is a second verification pass result.

A process that the resource transfer certificate is transferred to the second blockchain, the second consensus node in the second blockchain performs verification processing on the resource transfer certificate, and the first virtual resource can be transferred to the first resource transfer-in address in a case that the second verification result is a second verification pass result to realize secure process of the first virtual resource, which improves the transfer reliability of the first virtual resource.

The first service node transfers the second virtual resource to the second resource transfer-in address by running a cross-chain resource transfer contract in a case that the first virtual resource belongs to the second resource transfer-out address. In a case that the first virtual resource belongs to the virtual resource pool corresponding to the second blockchain (for ease of differentiation, called a second virtual resource pool for short), for example, a virtual resource pool 40e shown in FIG. 5, the first service node transfers the second virtual resource to the virtual resource pool corresponding to the first blockchain by running the cross-chain resource transfer contract (for ease of differentiation, called a first virtual resource pool for short). It can be understood that the first virtual resource pool may also be a virtual resource set that is set by the first blockchain for an on-chain address in a case that the second virtual resource pool is a virtual resource set that is set by the second blockchain for an on-chain address. In a case that the second virtual resource pool is an address that is logged in by the cross-chain service device and belongs to the second blockchain, the first virtual resource pool may also be an address that is logged in by a cross-chain service device and belongs to the first blockchain.

In a case that the association relationship between the first blockchain and the second blockchain is an isomorphic association relationship, as shown in FIG. 6, the first service node 201b may transmit the resource transfer certificate 60c to a second consensus network corresponding to the second blockchain, so that the second consensus node in the second consensus network invokes a verification contract 60d corresponding to the cross-chain resource transfer contract. By running the verification contract 60d, the second consensus node may perform verification processing on the resource transfer certificate 60c to obtain a second verification result, and return the second verification result to the first service node. In a case that the second verification result is a second verification pass result, the first service node 201b transfers the first virtual resource to the first resource transfer-in address, in FIG. 6, the address 203a illustrates the second resource transfer-out address 40c, and the address 202a illustrates the first resource transfer-in address 20g.

In an embodiment of this disclosure, when the cross-chain resource transfer request initiated by the first resource transfer-out address is acquired, the first service node that belongs to service nodes corresponding to the first blockchain may instruct the second service node that belongs to service nodes corresponding to the second blockchain to lock the first virtual resource corresponding to the virtual resource value for the first resource transfer-in address in the second blockchain through a cross-chain resource transfer request. The second blockchain is different from the first blockchain. A subsequent problem that the first virtual resource is transferred to the first resource transfer-in address when the second virtual resource is not transferred out from the first resource transfer-out address can be avoided through the process, so computational consumption caused by invalid resource transfer can be avoided. Further, resource transfer-out processing may be performed on the second virtual resource associated with a virtual resource value in the first resource transfer-out address in the first blockchain in a case that the second service node locks the first virtual resource successfully. After the second virtual resource is transferred out successfully, the first service node generates a resource transfer transaction including the first resource transfer-out address and the virtual resource value, and then a resource transfer certificate generated for the resource transfer transaction is acquired. Cross-chain resource transfer may be converted into in-chain resource transfer through the resource transfer transaction and the first virtual resource locked by the second blockchain in the process, so the resource transfer efficiency can be improved. Further, the second service node transfers the first virtual resource to the first resource transfer-in address according to the resource transfer certificate. In this process, resource transfer may be performed in each of the first blockchain and the second blockchain through the resource transfer certificate to prevent the second virtual resource from being transferred through a third party, so the second virtual resource cannot be transferred out of the first blockchain, and then the security of the second virtual resource can be improved. It can be known from the above that, according to the embodiment of this disclosure, cross-chain resource transfer can be performed in two chains of the first blockchain and the second blockchain securely and efficiently through the first virtual resource, the second virtual resource, and the resource transfer certificate.

Figure 7:
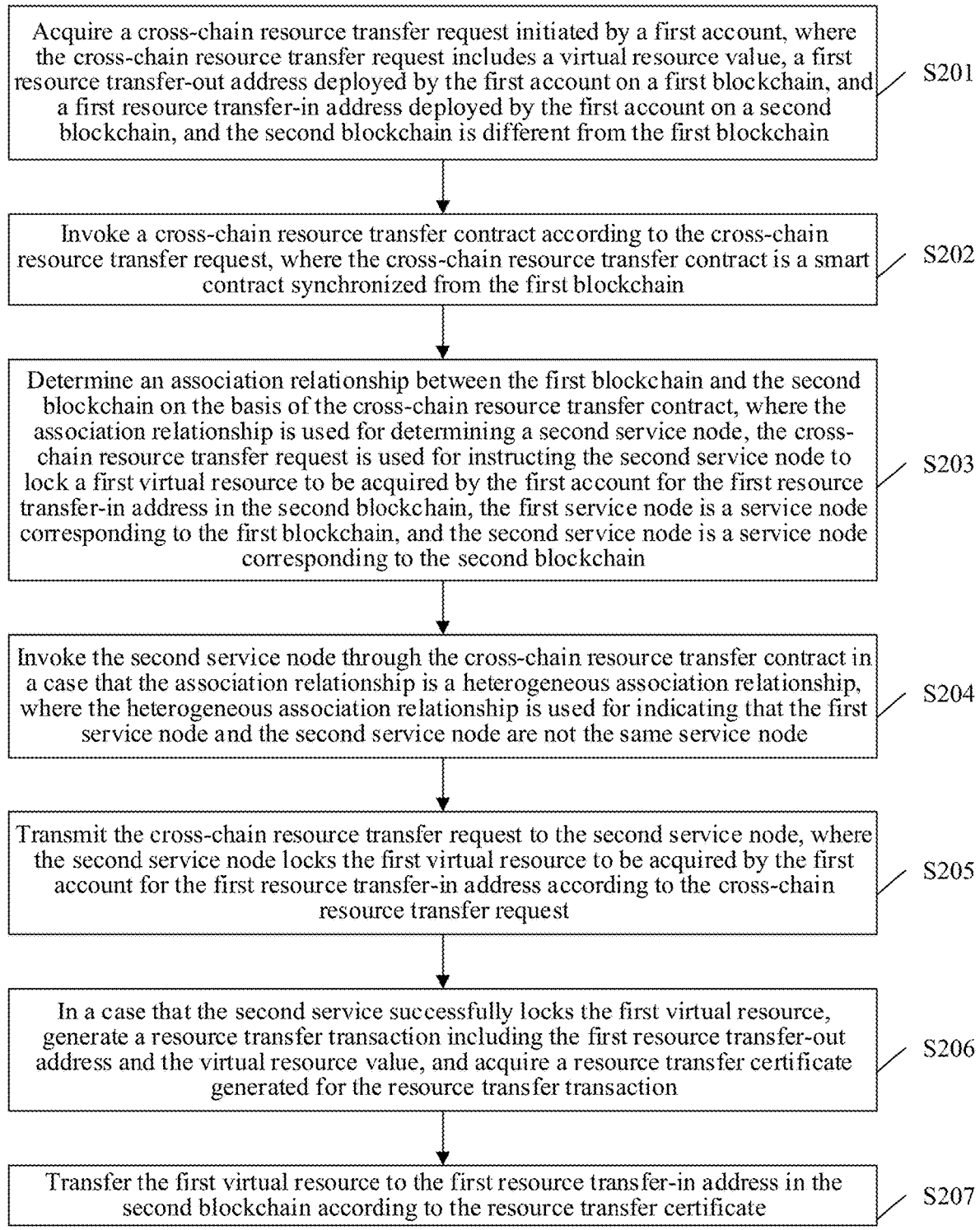
FIG. 7 is a second schematic flowchart of blockchain-based data processing method provided by an embodiment of this disclosure.

Please refer to FIG. 7, which is a second schematic flowchart of blockchain-based data processing method provided by an embodiment of this disclosure. The blockchain-based data processing method may be performed by the first service node, or may be performed by a second service node, or may be performed by the first service node and the second service node interactively. No limits are made herein. For the convenience of description and understanding, the embodiment of this disclosure is described by taking an example in which the method is performed in the first service node. The first service node may be any first service node in the first service network of the embodiment corresponding to FIG. 1. As shown in FIG. 7, the blockchain-based data processing method may at least include the following steps S201 to step S207.

Step S201: Acquire a cross-chain resource transfer request initiated by a first account. The cross-chain resource transfer request includes a virtual resource value, a first resource transfer-out address deployed by the first account on a first blockchain, and a first resource transfer-in address deployed by the first account on a second blockchain. The second blockchain is different from the first blockchain.

For an implementation process of step S201, please refer to step S101 in an embodiment corresponding to FIG. 3 above, and details are not described herein again.

Step S202: Invoke a cross-chain resource transfer contract according to the cross-chain resource transfer request. The cross-chain resource transfer contract is a smart contract synchronized from the first blockchain.

Schematically, the cross-chain resource transfer contract is acquired, the cross-chain resource transfer contract is a contract that a cross-chain service device is successfully deployed on the first blockchain, a first consensus node in the first blockchain is used for performing uploading processing on the cross-chain resource transfer contract, and the uploading processing is used for configuring the cross-chain resource transfer contract on the first blockchain.

The cross-chain service device is a device that supports cross-chain resource transfer. Schematically, the first account realizes a resource transfer process through the cross-chain service device. In order to realize a cross-chain transfer process between the first blockchain and the second blockchain, the cross-chain service device can more securely and efficiently make the first blockchain reach consensus in a manner of deploying the cross-chain resource transfer contract, so as to perform a cross-chain resource transfer process through an invoking process of the first service node.

Figure 8:
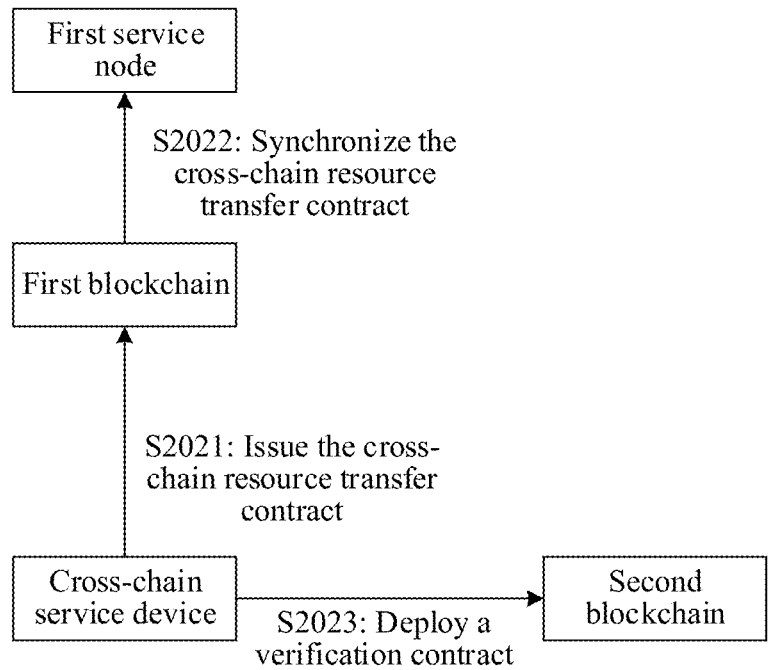
FIG. 8 is an interaction diagram of a blockchain-based cross-chain resource transfer contract synchronization method provided by an embodiment of this disclosure.

Please refer to FIG. 8 together, which is an interaction diagram of a blockchain-based cross-chain resource transfer contract synchronization method provided by an embodiment of this disclosure. As shown in FIG. 8 together, step S2021: A cross-chain service device issues a cross-chain resource transfer contract to a first blockchain. The cross-chain resource transfer contract is contract code, and is uploaded to the first blockchain by the cross-chain service device. It has the function of checking a transaction before the transaction is uploaded to a chain, a function of recalling after the transaction is synchronized, and a function of supplementing service information for a service transaction. The cross-chain resource transfer contract in the embodiment of this disclosure is stored in the first blockchain as a piece of certificate storage data, and is deployed and runs on a service node. Step S2022: The first service node synchronizes the cross-chain resource transfer contract. The first service node corresponding to the first blockchain may select synchronous saving according its own service type, and verifies the correctness and the losslessness of the contract code through a blockchain hash feature. Step S2023: A cross-chain service device deploys a verification contract to a second blockchain. The verification contract is used for verifying data in the first blockchain, for example, the legality of the resource transfer certificate.

Step S203: Determine an association relationship between the first blockchain and the second blockchain on the basis of the cross-chain resource transfer contract. The association relationship is used for determining a second service node. The cross-chain resource transfer request is used for instructing a second service node to lock a first virtual resource to be acquired by the first account for the first resource transfer-in address in the second blockchain. The first service node is a service node corresponding to the first blockchain. The second service node is a service node corresponding to the second blockchain.

Figure 9:
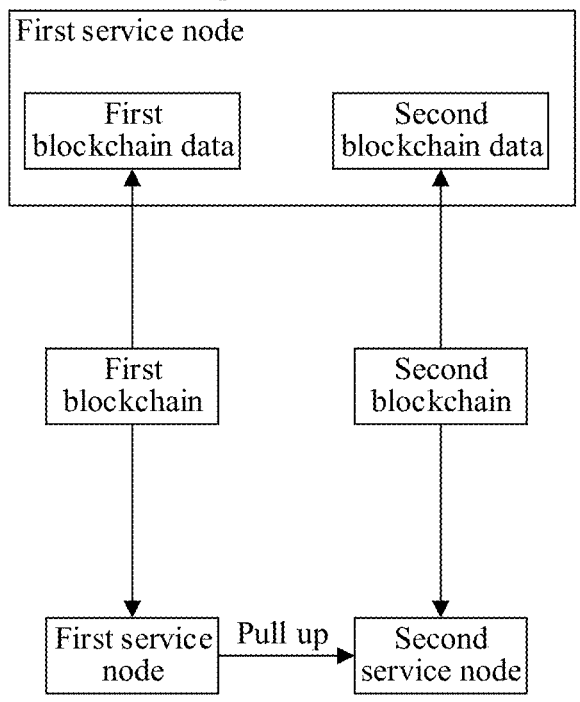
FIG. 9 is a schematic diagram of an association relationship between a first blockchain and a second blockchain provided by an embodiment of this disclosure.

Please refer to FIG. 9 together, which is a schematic diagram of an association relationship between a first blockchain and a second blockchain provided by an embodiment of the present application. As shown in FIG. 9, forms of the first blockchain and the second blockchain may be divided into two types: an isomorphic chain and a heterogeneous chain. The isomorphic chain represents that chain data structures and network interfaces (organization manners) are the same. The heterogeneous chain is on the contrary, and the data structures and the organization manners are different. In a case that the first blockchain and the second blockchain are heterogeneous chains, data of two chains may be synchronized and access other each by running a first service node sequence because the first service node has the data of the first blockchain and the data of the second blockchain. The heterogeneous chains need to run spvs of different chains respectively, that is, the first blockchain need to run the first service node, the second blockchain needs to be run the second service node, and the access between the spvs is similar to the form of program application pull-up or backend interface access to use data of each other.

In a heterogeneous association relationship, a cross-chain transfer process needs to be integrally by means of the first service node and the second service node. In this process, a cross-chain resource transfer request for locking the first virtual resource is transmitted to the second service node through a communication relationship between the first service node and the second service node, so as to achieve a purpose of locking the first virtual resource more intuitively and quickly.

Step S204: Invoke the second service node through the cross-chain resource transfer contract in a case that the association relationship is a heterogeneous association relationship. The heterogeneous association relationship is used for indicating that the first service node and the second service node are not the same service node.

Step S205: Transmit the cross-chain resource transfer request to the second service node. The second service node locks the first virtual resource to be acquired by the first account for the first resource transfer-in address according to the cross-chain resource transfer request.

Figure 10:
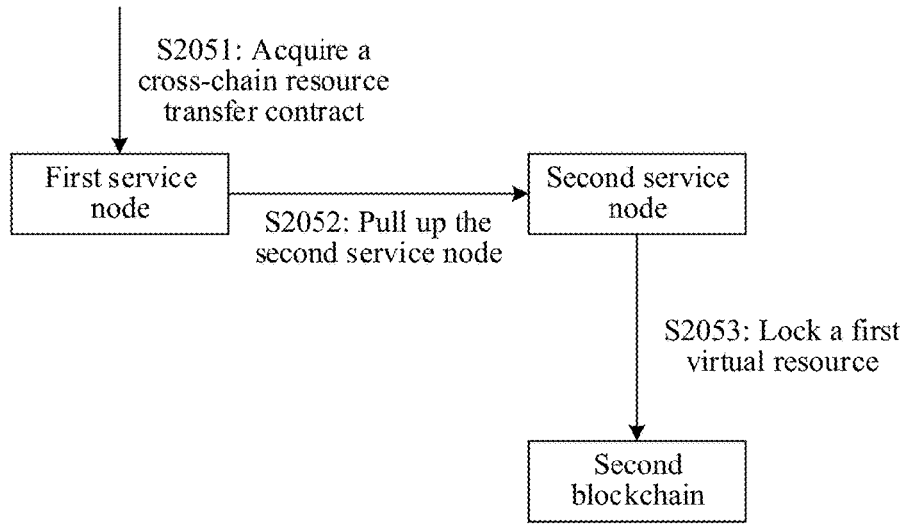
FIG. 10 is a first interaction flowchart of a blockchain-based data processing method provided by an embodiment of this disclosure.

Please refer to the embodiment corresponding to FIG. 3 above for a scenario in which the association relationship is the isomorphic association relationship. The embodiment of this disclosure is used for describing the scenario in which the association relationship is the heterogeneous association relationship in combination with the descriptions in step S204 to step S205. Please refer to FIG. 10 together, which is a first interaction flowchart of a blockchain-based data processing method provided by an embodiment of this disclosure. As shown in FIG. 10, step S2051: The first service node acquires the cross-chain resource transfer request. A service object holding the first resource transfer-out address transmits a cross-chain transfer transaction to the first service node through the first resource transfer-out address. Step S2052: The first service node pulls up the second service node. In a case that the association relationship is the heterogeneous association relationship, the first service node serves the first blockchain, but does not serve the second blockchain, and similarly, the second service node serves the second blockchain, but does not serve the first blockchain. At this moment, the first service node may invoke (pull up) the second service node through the cross-chain resource transfer contract in the embodiment of this disclosure. Step S2053: The second service node locks the first virtual resource in the second blockchain. Locking the first virtual resource is similar to placing an order first but not paying. It may be locked in a virtual resource pool corresponding to the second blockchain, or may be locked at other addresses that are willing to sell a virtual resource, for example, the second resource transfer-out address. It can be understood that, in a case that the association relationship is the heterogeneous association relationship, the first virtual resource is locked for the first resource transfer-in address in the second blockchain through the second service node that does not serve the first blockchain. However, a process of locking the first virtual resource by the second service node is the same as the process of locking the first virtual resource by the first service node.

Step S206: In a case that the second service node successfully locks the first virtual resource, generate a resource transfer transaction including the first resource transfer-out address and the virtual resource value, and acquire a resource transfer certificate generated for the resource transfer transaction.

Please refer to step S102 in an embodiment corresponding to FIG. 3 above for an implementation process in step S206, and details are not described herein again.

Step S207: Transfer the first virtual resource to the first resource transfer-in address in the second blockchain according to the resource transfer certificate.

Figure 11:
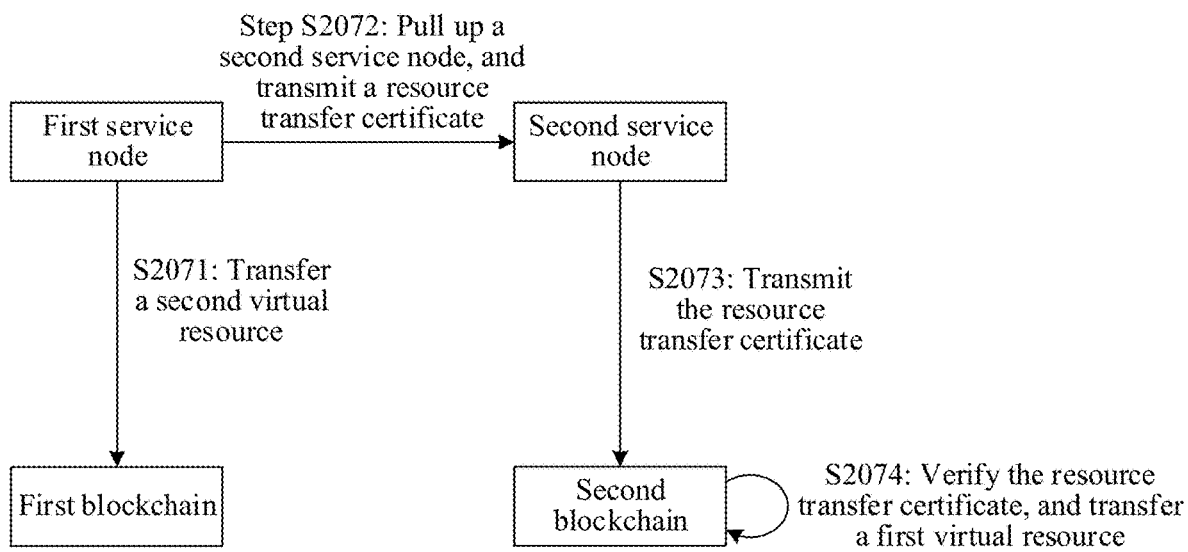
FIG. 11 is a second interaction flowchart of a blockchain-based data processing method provided by an embodiment of this disclosure.

Please refer to the embodiment corresponding to FIG. 3 above for a scenario in which the association relationship is the isomorphic association relationship, and the embodiment of this disclosure is used for describing the scenario in which the association relationship is the heterogeneous association relationship. Please refer to FIG. 11 together, which is a second interaction flowchart of a blockchain-based data processing method provided by an embodiment of this disclosure. Step S2071: A first service node transfers a second virtual resource in a first blockchain. Step S2072: The first service node pulls up a second service node, and transmits a resource transfer certificate. Step S2073: The second service node transmits the resource transfer certificate to a second blockchain. Step S2074: The second blockchain verifies the resource transfer certificate, and transfers a first virtual resource. It is worth noting that when data transmission is performed between the first service node and the second service node, data that needs to be transmitted may be signed by its own key, or data that needs to be transmitted may be encrypted by a key of the other party. In addition, a private key signature corresponding to an address is used for transferring a resource on a chain, and the address does not need to host a private key by the method provided by the embodiment of this disclosure.

In an embodiment of this disclosure, when the cross-chain resource transfer request initiated by the first account is acquired, the first service node corresponding to the first blockchain instructs, through the cross-chain resource transfer request, the second service node corresponding to the second blockchain to lock a first virtual resource to be acquired by the first account for the first resource transfer-in address deployed by the first account on the second blockchain in the second blockchain. The second blockchain is different from the first blockchain. A subsequent problem that the first virtual resource is transferred to the first resource transfer-in address when the second virtual resource is not transferred out from the first resource transfer-out address can be avoided through the process, so computational consumption caused by invalid resource transfer can be avoided. Resource transfer-out processing is performed on the second virtual resource associated with a virtual resource value in the first resource transfer-out address in a case that the second service node locks the first virtual resource successfully. Cross-chain resource transfer is converted into in-chain resource transfer through the first virtual resource locked by the second blockchain in the process, so as to improve the resource transfer efficiency. The resource transfer certificate is used for instructing the second service node to transfer the first virtual resource to the first resource transfer-in address in the second blockchain in a case that the second virtual resource is transferred out successfully. the first virtual resource and the second virtual resource are prevented from being transferred through a third party by a process of performing resource transfer in each of the first blockchain and the second blockchain, the second virtual resource cannot be transferred out of the first blockchain, and the first virtual resource will not be transferred out of the second blockchain, so the security of the first virtual resource and the second virtual resource can be improved. That is: cross-chain resource transfer can be performed in two chains of the first blockchain and the second blockchain securely and efficiently through the first virtual resource, the second virtual resource, and a resource transfer certificate.

Figure 12:
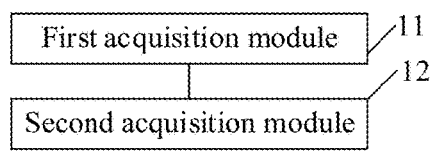
FIG. 12 is a schematic structural diagram of a blockchain-based data processing apparatus provided by an embodiment of this disclosure.

Further, please refer to FIG. 12, which is a first schematic diagram of a blockchain-based data processing apparatus provided by an embodiment of this disclosure. The blockchain-based data processing apparatus may run on a first service node. The blockchain-based data processing apparatus 1 may be configured to perform corresponding steps in the method provided by the embodiments of this disclosure. As shown in FIG. 12, the blockchain-based data processing apparatus 1 may include: a first acquisition module 11 and a second acquisition module 12.

The first acquisition module 11 is configured to acquire a cross-chain resource transfer request initiated by a first account. The cross-chain resource transfer request includes a virtual resource value, a first resource transfer-out address deployed by the first account on a first blockchain, and a first resource transfer-in address deployed by the first account on a second blockchain. The second blockchain is different from the first blockchain. The cross-chain resource transfer request is used for instructing a second service node to lock a first virtual resource to be acquired by the first account for the first resource transfer-in address in the second blockchain. The first virtual resource is corresponding to the virtual resource value. The first service node is a service node corresponding to the first blockchain. The second service node is a service node corresponding to the second blockchain.

The second acquisition module 12 is configured to: perform resource transfer-out processing on a second virtual resource associated with the virtual resource value in the first resource transfer-out address in a case that the second service node locks the first virtual resource successfully; and transfer the first virtual resource to the first resource transfer-in address in the second blockchain in a case that the second virtual resource is transferred out successfully.

In an embodiment, the second acquisition module 12 is further configured to: determine a second resource transfer-in address corresponding to a second resource transfer-out address from the first blockchain in a case that the second service node locks the first virtual resource from the second resource transfer-out address, where the second resource transfer-out address is an address registered by a second account on the second blockchain, the second resource transfer-in address is an address registered by the second account on the first blockchain, and the second resource transfer-in address is used for characterizing a transfer-in address after transfer-out processing is performed on the second virtual resource in the first blockchain; and transfer the second virtual resource transferred out from the first resource transfer-out address to the second resource transfer-in address.

In an embodiment, the second acquisition module 12 is further configured to: determine a virtual resource pool corresponding to the first blockchain in a case that the second service node locks the first virtual resource from a virtual resource pool corresponding to the second blockchain; and transfer the second virtual resource transferred out from the first resource transfer-out address to the virtual resource pool corresponding to the first blockchain.

In an embodiment, the second acquisition module 12 is further configured to: generate a resource transfer certificate in a case that the second virtual resource is transferred out successfully; and transmit the resource transfer certificate to the second blockchain, the resource transfer certificate being used for instructing the second blockchain to transfer the first virtual resource to the first resource transfer-in address.

In an embodiment, the second acquisition module 12 is further configured to: generate the resource transfer certificate in a case that the second virtual resource is successfully transferred to the second resource transfer-in address in the first blockchain; or, generate the resource transfer certificate in a case that the second virtual resource is successfully transferred to the virtual resource pool corresponding to the first blockchain in the first blockchain.

In an embodiment, the second acquisition module 12 is further configured to: invoke a cross-chain resource transfer contract according to the cross-chain resource transfer request, where the cross-chain resource transfer contract is a smart contract synchronized from the first blockchain; and determine an association relationship between the first blockchain and the second blockchain on the basis of the cross-chain resource transfer contract, where the association relationship is used for determining the second service node.

In an embodiment, the second acquisition module 12 is further configured to: respectively acquire a first chain structure of the first blockchain and a second chain structure of a second blockchain on the basis of the cross-chain resource transfer contract, where a chain structure includes a chain data structure and an organization manner of a blockchain; compare the first chain structure with the second chain structure, and determine the association relationship between the first blockchain and the second blockchain as an isomorphic association relationship in a case that the first chain structure is the same as the second chain structure; and determine the association relationship between the first blockchain and the second blockchain as a heterogeneous association relationship in a case that the first chain structure is different from the second chain structure.

In an embodiment, the association relationship includes an isomorphic association relationship, and the isomorphic association relationship indicates that the first service node and the second service node are the same service node; and the second acquisition module 12 is further configured to: in a case that a resource locking permission response returned by the second resource transfer-out address is acquired in the second blockchain, lock, according to the resource locking permission response, the first virtual resource to be acquired by the first account for the first resource transfer-in address in the second resource transfer-out address; or acquire the first virtual resource for the first resource transfer-in address from the virtual resource pool corresponding to the second blockchain in a case that a resource locking permission response is not acquired in the second blockchain.

In an embodiment, the second acquisition module 12 is further configured to: query a third virtual resource held by the second resource transfer-out address according to the resource locking permission response; lock the first virtual resource for the first resource transfer-in address from the third virtual resource in a case that the third virtual resource is not less than the first virtual resource corresponding to the virtual resource value; or lock the first virtual resource for the first resource transfer-in address from the virtual resource pool corresponding to the second blockchain in a case that the third virtual resource is less than the first virtual resource.

In an embodiment, the second acquisition module 12 is further configured to acquire the third virtual resource for the first resource transfer-in address from the second resource transfer-out address in a case that the third virtual resource is less than the first virtual resource, determine a first virtual resource difference value between the first virtual resource and the third virtual resource, and lock the first virtual resource for the first resource transfer-in address from the virtual resource pool corresponding to the second blockchain.

In an embodiment, the second acquisition module 12 is further configured to: invoke the second service node through the cross-chain resource transfer contract in a case that the association relationship is a heterogeneous association relationship, where the heterogeneous association relationship is used for indicating that the first service node and the second service node are not the same service node; and transmit the cross-chain resource transfer request to the second service node, where the second service node locks, according to the cross-chain resource transfer request, the first virtual resource to be acquired by the first account for the first resource transfer-in address.

In an embodiment, the second acquisition module 12 is further configured to acquire a cross-chain resource transfer contract, where the cross-chain resource transfer contract is a contract that a cross-chain service device is successfully deployed on the first blockchain, a first consensus node in the first blockchain is used for performing uploading processing on the cross-chain resource transfer contract, and the uploading processing is used for configuring the cross-chain resource transfer contract on the first blockchain.

In an embodiment, the second acquisition module 12 is further configured to generate a resource transfer transaction including a virtual resource value and the first resource transfer-out address in a case that the second virtual resource is transferred out successfully, and acquire the resource transfer certificate generated for the resource transfer transaction.

In an embodiment, the second acquisition module 12 is further configured to transmit the resource transfer transaction to the first consensus node corresponding to the first blockchain, where the first consensus node performs uploading processing on the resource transfer transaction to obtain an upload result, the upload result includes an upload success result, and the upload success result is used for instructing the first consensus node to generate the resource transfer certificate for the resource transfer transaction; and acquire the resource transfer certificate returned by the first consensus node.

In an embodiment, the second acquisition module 12 is further configured to: perform validation processing on the resource transfer certificate to obtain a first verification result; transfer the first virtual resource transferred out from the second resource transfer-out address to the first resource transfer-in address in a case that the first virtual resource is a resource locked in the second resource transfer-out address under a condition that the first verification result is a first verification pass result, where the second resource transfer-out address is an address deployed by the second account in the second blockchain, the second account is an account holding the first virtual resource, and the second resource transfer-in address is an address deployed by the second account in the first blockchain; and transfer the first virtual resource locked in the virtual resource pool corresponding to the second blockchain to the first resource transfer-in address in a case that the first virtual resource is a resource locked in the virtual resource pool corresponding to the second blockchain.

In an embodiment, the second acquisition module 12 is further configured to: transmit the resource transfer certificate to the second blockchain in a case that the association relationship is an isomorphic association relationship, where a second consensus node corresponding to the second blockchain performs verification processing on the resource transfer certificate through a verification contract to obtain a second verification result, and the isomorphic association relationship indicates that the first service node and the second service node are the same service node; and transfer the first virtual resource to the first resource transfer-in address in a case that the second verification result returned by the second consensus node is a second verification pass result.

In an embodiment of this disclosure, when the cross-chain resource transfer request initiated by the first account is acquired, the first service node corresponding to the first blockchain instructs, through the cross-chain resource transfer request, the second service node corresponding to the second blockchain to lock a first virtual resource to be acquired by the first account for the first resource transfer-in address deployed by the first account on the second blockchain in the second blockchain. The second blockchain is different from the first blockchain. A subsequent problem that the first virtual resource is transferred out from the first resource transfer-in address when the second virtual resource is not transferred out from the first resource transfer-out address can be avoided through the process, so computational consumption caused by invalid resource transfer can be avoided. Further, resource transfer-out processing is performed on the second virtual resource associated with a virtual resource value in the first resource transfer-out address in a case that the second service node locks the first virtual resource successfully. Cross-chain resource transfer is converted into in-chain resource transfer through the first virtual resource locked by the second blockchain in the process, so as to improve the resource transfer efficiency. Further, the first virtual resource is transferred to the first resource transfer-in address in the second blockchain in a case that the second virtual resource is transferred out successfully; the first virtual resource and the second virtual resource are prevented from being transferred through a third party by a process of performing resource transfer in each of the first blockchain and the second blockchain, the second virtual resource cannot be transferred out of the first blockchain, and the first virtual resource will not be transferred out of the second blockchain, so the security of the first virtual resource and the second virtual resource can be improved. That is: cross-chain resource transfer can be performed in two chains of the first blockchain and the second blockchain securely and efficiently through the first virtual resource, the second virtual resource, and a resource transfer certificate.

Figure 13:
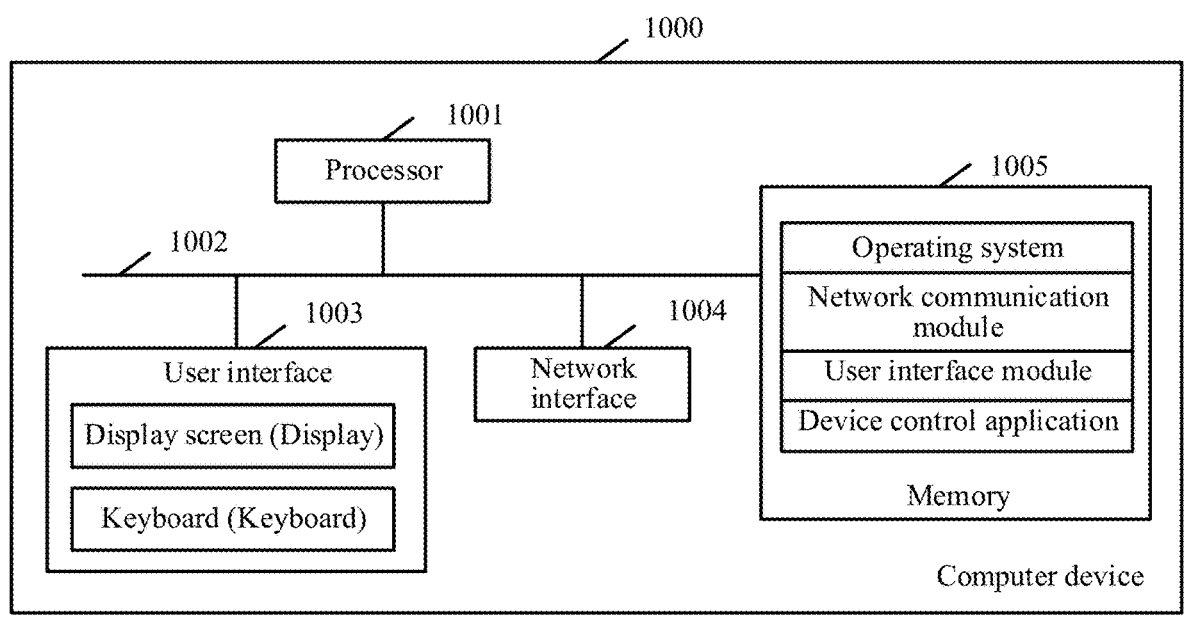
FIG. 13 is a schematic structural diagram of a computer device provided by an embodiment of this disclosure.

In an embodiment of this disclosure, please refer to FIG. 13, which is a schematic structural diagram of a computer device according to an embodiment of this disclosure. As shown in FIG. 13, the computer device 1000 may include: at least one processor 1001, for example, a CPU (or processing circuitry), at least one network interface 1004, a user interface 1003, a memory 1005 (or a non-transitory computer-readable storage medium), and at least one communications bus 1002. The communications bus 1002 is configured to implement connection and communication between these components. In some embodiments, the user interface 1003 may include a display and a keyboard. The user interface 1004 may include a standard wired interface and wireless interface (for example, a WI-FI interface). The memory 1005 may be a high-speed random access memory (RAM), or may be a non-volatile memory (non-volatile memory), for example, at least one magnetic disk memory. The memory 1005 may be at least one storage apparatus located remotely from the foregoing processor 1001. As shown in FIG. 13, the memory 1005 used as a computer storage medium may include an operating system, a network communication module, a user interface module, and a device control application program.

In the computer device 1000 as shown in FIG. 13, the network interface 1004 may provide a network communication function. The user interface 1003 is mainly configured to provide an interface for a user to input. The processor 1001 may be configured to invoke a device control application stored in the memory 1005 to implement the above blockchain-based data processing method.

It is to be understood that the computer device 1000 described in the embodiment of this disclosure may perform the descriptions of the blockchain-based data processing method or apparatus in various embodiments hereinabove, and details are not described herein again. In addition, the description of beneficial effects achieved by the same method are not described herein again.

An embodiment of this disclosure further provides a non-transitory computer-readable storage medium. The computer-readable storage medium stores a computer program, and the computer program implements the descriptions of the blockchain-based data processing method or apparatus in various embodiments hereinabove when executed by a processor, and details are not described herein again. In addition, the description of beneficial effects achieved by the same method are not described herein again.

The above computer-readable storage medium may be the blockchain-based data processing apparatus provided in any of the previous embodiments or an internal storage unit of the above computer device, for example, a hard disk or a memory of the computer device.

The embodiment of this disclosure further provides a computer program product. The computer program product includes a computer program. The computer program is stored in the computer-readable storage medium. A processor of a computer device reads the computer program from the computer-readable storage medium, and the processor executes the computer program, so that the computer device may perform the descriptions of the blockchain-based data processing method or apparatus in various embodiments hereinabove, and details are not described herein again. In addition, the description of beneficial effects achieved by the same method are not described herein again.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

The use of "at least one of" in the disclosure is intended to include any one or a combination of the recited elements. For example, references to at least one of A, B, or C; at least one of A, B, and C; at least one of A, B, and/or C; and at least one of A to C are intended to include only A, only B, only C or any combination thereof.

The foregoing disclosure includes some exemplary embodiments of this disclosure which are not intended to limit the scope of this disclosure. Other embodiments shall also fall within the scope of this disclosure.

What is claimed is:

1. A blockchain-based data processing method, comprising:
   acquiring, by a first service node of a first blockchain, a cross-chain resource transfer request initiated by a first account, the cross-chain resource transfer request comprising a virtual resource value, a first resource transfer-out address on the first blockchain, and a first resource transfer-in address on a second blockchain, the second blockchain being different from the first blockchain, the cross-chain resource transfer request being used by a second service node of the second blockchain to lock a first virtual resource of the virtual resource value in the second blockchain; and
   performing resource transfer-out processing on a second virtual resource associated with the virtual resource value in the first resource transfer-out address in response to a determination that the second service node locked the first virtual resource successfully using the cross-chain resource request; and
   transferring the first virtual resource to the first resource transfer-in address in the second blockchain in response to a determination that the second virtual resource was transferred out successfully.

2. The method according to claim 1, wherein the performing the resource transfer-out processing comprises:
   determining a second resource transfer-in address corresponding to the second resource transfer-out address from the first blockchain in response to a determination that the second service node locked the first virtual resource from the second resource transfer-out address, the second resource transfer-out address being an address registered by a second account on the second blockchain, the second resource transfer-in address being an address registered by the second account on the first blockchain, and the second resource transfer-in address characterizing a transfer-in address after transfer-out processing is performed on the second virtual resource in the first blockchain; and
   transferring the second virtual resource transferred out from the first resource transfer-out address to the second resource transfer-in address.

3. The method according to claim 1, wherein the performing the resource transfer-out processing comprises:
   determining a virtual resource pool corresponding to the first blockchain in response to a determination that the second service node locked the first virtual resource from a virtual resource pool corresponding to the second blockchain; and
   transferring the second virtual resource transferred out from the first resource transfer-out address to the virtual resource pool corresponding to the first blockchain.

4. The method according to claim 3, further comprising:
   generating a resource transfer certificate in response to a determination that the second virtual resource was transferred out successfully; and
   transmitting the resource transfer certificate to the second blockchain, the resource transfer certificate indicating to the second blockchain to transfer the first virtual resource to the first resource transfer-in address.

5. The method according to claim 4, wherein the generating the resource transfer certificate comprises:
   generating the resource transfer certificate in response to a determination that the second virtual resource was successfully transferred to the second resource transfer-in address in the first blockchain; or,
   generating the resource transfer certificate in response to a determination that the second virtual resource was successfully transferred to the virtual resource pool corresponding to the first blockchain in the first blockchain.

6. The method according to claim 3, further comprising:
   invoking a cross-chain resource transfer contract according to the cross-chain resource transfer request, the cross-chain resource transfer contract being a smart contract synchronized with the first blockchain; and
   determining an association relationship between the first blockchain and the second blockchain based on of the cross-chain resource transfer contract, the association relationship indicating the second service node.

7. The method according to claim 6, wherein the determining the association relationship comprises:
   respectively acquiring a first chain structure of the first blockchain and a second chain structure of a second blockchain on the basis of the cross-chain resource transfer contract, a chain structure comprising a blockchain data structure and a blockchain organization manner;
   comparing the first chain structure with the second chain structure, and determining the association relationship between the first blockchain and the second blockchain as an isomorphic association relationship in response to a determination that the first chain structure is the same as the second chain structure; and
   determining the association relationship between the first blockchain and the second blockchain as a heterogeneous association relationship in response to a determination that the first chain structure is different from the second chain structure.

8. The method according to claim 6, wherein
   the association relationship comprises an isomorphic association relationship indicating that the first service node and the second service node are the same service node; and
   the method further comprises:
      in response to a determination that a resource locking permission response returned from the second resource transfer-out address is acquired in the second blockchain, locking, according to the resource locking permission response, the first virtual resource in the second resource transfer-out address; or
      acquiring the first virtual resource from the virtual resource pool corresponding to the second blockchain in response to a determination that the resource locking permission response was not acquired in the second blockchain.

9. The method according to claim 8, wherein the locking, according to the resource locking permission response, the first virtual resource comprises:
   querying a third virtual resource held by the second resource transfer-out address according to the resource locking permission response;
   locking the first virtual resource from the third virtual resource in response to a determination that the third virtual resource is not less than the first virtual resource corresponding to the virtual resource value; or
   locking the first virtual resource from the virtual resource pool corresponding to the second blockchain in response to a determination that the third virtual resource is less than the first virtual resource.

10. The method according to claim 9, wherein the locking the first virtual resource from the virtual resource pool comprises:
acquiring the third virtual resource from the second resource transfer-out address in response to a determination that the third virtual resource is less than the first virtual resource; and
determining a first virtual resource difference value between the first virtual resource and the third virtual resource, and locking the first virtual resource from the virtual resource pool corresponding to the second blockchain.

11. The method according to claim 6, further comprising:
invoking the second service node through the cross-chain resource transfer contract in response to a determination that the association relationship is a heterogeneous association relationship indicating that the first service node and the second service node are not the same service node; and
transmitting the cross-chain resource transfer request to the second service node, the second service node locking, according to the cross-chain resource transfer request, the first virtual resource to be acquired by the first account for the first resource transfer-in address.

12. The method according to claim 6, further comprising:
acquiring a cross-chain resource transfer contract indicating that a cross-chain service device is successfully deployed on the first blockchain, a first consensus node in the first blockchain performing uploading processing on the cross-chain resource transfer contract, and the uploading processing including configuring the cross-chain resource transfer contract on the first blockchain.

13. The method according to claim 12, the generating the resource transfer certificate comprises:
generating a resource transfer transaction comprising the virtual resource value and the first resource transfer-out address in response to a determination that the second virtual resource was transferred out successfully; and
acquiring the resource transfer certificate generated for the resource transfer transaction.

14. The method according to claim 13, wherein the acquiring the resource transfer certificate generated for the resource transfer transaction comprises:
transmitting the resource transfer transaction to the first consensus node corresponding to the first blockchain, the first consensus node performing uploading processing on the resource transfer transaction to obtain an upload result, the upload result comprising an upload success result, and the upload success result being used by the first consensus node to generate the resource transfer certificate for the resource transfer transaction; and
acquiring the resource transfer certificate returned by the first consensus node.

15. The method according to claim 4, further comprising:
transmitting the resource transfer certificate to the second blockchain, the second blockchain performing verification processing on the resource transfer certificate to obtain a first verification result;
transferring the first virtual resource transferred from the second resource transfer-out address to the first resource transfer-in address in response to a determination that the first virtual resource is locked in the second resource transfer-out address under a condition that the first verification result is a first verification pass result, the second resource transfer-out address being an address deployed by the second account in the second blockchain, the second account being an account holding the first virtual resource, and the second resource transfer-in address being an address deployed by the second account in the first blockchain; and
transferring the first virtual resource locked in the virtual resource pool corresponding to the second blockchain to the first resource transfer-in address in response to a determination that the first virtual resource is locked in the virtual resource pool corresponding to the second blockchain.

16. The method according to claim 6, further comprising:
transmitting the resource transfer certificate to the second blockchain in response to a determination that the association relationship is an isomorphic association relationship indicating that the first service node and the second service node are the same service node, a second consensus node corresponding to the second blockchain performing verification processing on the resource transfer certificate through a verification contract to obtain a second verification result, and the first virtual resource being transferred to the first resource transfer-in address in response to a determination that the second verification result returned by the second consensus node is a second verification pass result.

17. A blockchain-based data processing apparatus, comprising:
processing circuitry of a first service node of a first blockchain, the processing circuitry configured to
acquire a cross-chain resource transfer request initiated by a first account, the cross-chain resource transfer request comprising a virtual resource value, a first resource transfer-out address on the first blockchain, and a first resource transfer-in address on a second blockchain, the second blockchain being different from the first blockchain, the cross-chain resource transfer request being used by a second service node of the second blockchain to lock a first virtual resource of the virtual resource value in the second blockchain;
perform resource transfer-out processing on a second virtual resource associated with the virtual resource value in the first resource transfer-out address in response to a determination that the second service node locked the first virtual resource successfully using the cross-chain resource request; and
transfer the first virtual resource to the first resource transfer-in address in the second blockchain in response to a determination that the second virtual resource was transferred out successfully.

18. The apparatus according to claim 17, wherein the processing circuitry is further configured to:
determine a second resource transfer-in address corresponding to the second resource transfer-out address from the first blockchain in response to a determination that the second service node locked the first virtual resource from the second resource transfer-out address, the second resource transfer-out address being an address registered by a second account on the second blockchain, the second resource transfer-in address being an address registered by the second account on the first blockchain, and the second resource transfer-in address characterizing a transfer-in address after transfer-out processing is performed on the second virtual resource in the first blockchain; and transfer the second virtual resource transferred out from the first resource transfer-out address to the second resource transfer-in address.

19. The apparatus according to claim 17, wherein the processing circuitry is further configured to:
   determine a virtual resource pool corresponding to the first blockchain in response to a determination that the second service node locked the first virtual resource from a virtual resource pool corresponding to the second blockchain; and
   transfer the second virtual resource transferred out from the first resource transfer-out address to the virtual resource pool corresponding to the first blockchain.

20. A non-transitory computer-readable storage medium storing computer-readable instructions thereon, which, when executed by processing circuitry of a first service node of a first blockchain, cause the processing circuitry to perform a blockchain-based data processing method comprising:
   acquiring a cross-chain resource transfer request initiated by a first account, the cross-chain resource transfer request comprising a virtual resource value, a first resource transfer-out address on the first blockchain, and a first resource transfer-in address on a second blockchain, the second blockchain being different from the first blockchain, the cross-chain resource transfer request being used by a second service node of the second blockchain to lock a first virtual resource of the virtual resource value in the second blockchain; and performing resource transfer-out processing on a second virtual resource associated with the virtual resource value in the first resource transfer-out address in response to a determination that the second service node locked the first virtual resource successfully using the cross-chain resource request; and transferring the first virtual resource to the first resource transfer-in address in the second blockchain in response to a determination that the second virtual resource is transferred out successfully.

* * * * *